(12) United States Patent
Perry et al.

(10) Patent No.: US 6,943,789 B2
(45) Date of Patent: Sep. 13, 2005

(54) CONVERSION OF ADAPTIVELY SAMPLED DISTANCE FIELDS TO TRIANGLES

(75) Inventors: Ronald N. Perry, Cambridge, MA (US); Sarah F. Frisken, Cambridge, MA (US)

(73) Assignee: Mitsubishi Electric Research Labs, Inc, Cambridge, MA (US)

( * ) Notice: Subject to any disclaimer, the term of this patent is extended or adjusted under 35 U.S.C. 154(b) by 664 days.

(21) Appl. No.: 09/810,839

(22) Filed: Mar. 16, 2001

(65) Prior Publication Data

US 2002/0130856 A1 Sep. 19, 2002

(51) Int. Cl.$^7$ .......................... G06T 17/00; G09G 5/00
(52) U.S. Cl. ................................. 345/420; 345/581
(58) Field of Search ............................. 345/428, 420, 345/423, 581

(56) References Cited

U.S. PATENT DOCUMENTS

| 4,710,876 A | 12/1987 | Cline et al. ................ 364/414 |
| 5,898,793 A | 4/1999 | Karron et al. ............... 382/131 |
| 6,084,593 A | 7/2000 | Gibson ........................ 345/426 |
| 6,313,837 B1 * | 11/2001 | Assa et al. .................. 345/420 |
| 6,384,826 B1 * | 5/2002 | Bern et al. .................. 345/441 |
| 2002/0130854 A1 * | 9/2002 | Perry et al. ................. 345/420 |
| 2002/0130864 A1 * | 9/2002 | Perry et al. ................. 345/421 |

OTHER PUBLICATIONS

Jules Bloomenthal, "Polygonization of Implicit Surfaces", Xerox Parc. EDL–88–4, Dec., 1988.
Frisken et al., "Adaptively Sampled Distance Fields: A General Representation of Shape for Computer Graphics", Proceedings for SIGGRAPH 2000, pp. 249–254, 2000.
Sarah F. F. Gibson, "Constrained Elastic Surface Nets: Generating Smooth Surfaces from Binary Segmented Data",.
Sarah F. F. Gibson, "Using Distance Maps for Accurate Surface Representation in Sampled Volumes", Proceeding for IEEE Volume Visualization Symposium, pp. 23–30, 1998.
Karron et al., "The Spider Web Algorithm for Surface Construction from Medical Volume Data: Geometric Properties of its Surface",.
Lorenson, et al., "Marching Cubes: A High Resolution 3D Surface Construction Algorithm", Proceedings for SIGGRAPH, pp. 163–169, 1987.
Shekhar et al., "Octree–Based Decimation of Marching Cubes Surfaces", Proceedings for Visualization '96, pp. 335–342, 499, 1996.
Westermann et al., "Real–Time Exploration of Regular Volume Data by Adaptive Reconstruction of Iso–Surfaces",.

* cited by examiner

*Primary Examiner*—Sumati Lefkowitz
*Assistant Examiner*—Scott Wallace
(74) *Attorney, Agent, or Firm*—Dirk Brinkman

(57) ABSTRACT

A method for converts an adaptively sampled distance field of a graphics model to a triangle model, The adaptively sampled distance field includes surface cells storing distance values that have corresponding gradients. A vertex is assigned to a center location of each surface cell. The vertices of neighboring surface cells are connected to form triangles while satisfying a predetermined constraint. Then, each vertex is moved, in a single step, to a new location according to the distance value and corresponding gradient of the vertex to substantially conform the triangles to a surface of the model.

8 Claims, 17 Drawing Sheets

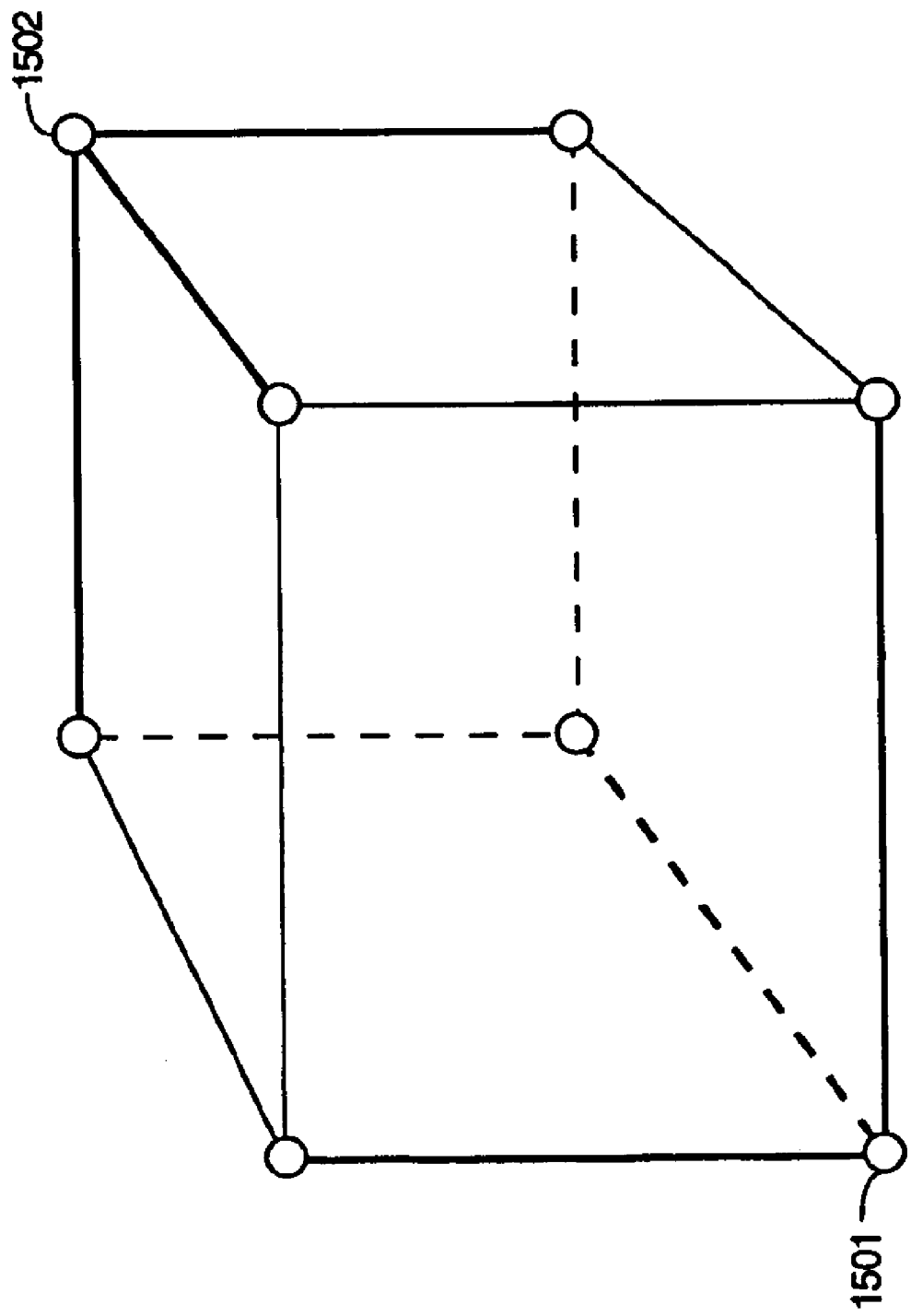

CONVERSION OF ADAPTIVELY SAMPLED DISTANCE FIELDS TO TRIANGLES

FIELD OF THE INVENTION

The invention relates generally to the field of shape representation, and in particular to the conversion of sampled distance fields to polygons.

BACKGROUND OF THE INVENTION

Designing realistic digitized models is a major challenge for the animation industry, particularly when the models represent characters such as people—real or imagined, animals, and cartoon characters. Animation artists generally employ two production methods, alone or in combination. In one method, maquettes are sculpted from a traditional medium like clay and then digitized. In another method, the models are constructed using one of several commercial or custom computerized modeling systems, such as MAYA, SoftImage, 3DStudioMax, FormZ, and Houdini.

Clay is the medium of choice for most animation artists because it is expressive, and working with clay is intuitive. It is difficult to improve on clay as the ideal modeling medium. A standard approach for designing clay-based digital models involves sculpting a clay maquette and digitizing or scanning the maquette to generate the digital model. There is a plethora of systems for scanning objects and generating surface models from the scanned data.

However, sculpting with clay and then digitizing the clay maquette has several limitations for digital animation. Much detail can be lost in the digitizing process because scanners and digitizers have inherent limitations in resolution, are unable to digitize occluded or hard-to-reach surfaces, and are subject to noise. Thus, some of the advantages of clay are lost in the scanning process. Furthermore, long-term storage of the clay models is difficult. It is important to note, however, that scanned models can provide good first order approximations to the geometry of the clay maquettes that can then be enhanced by a computer-based modeling system. Hence, it is important that any modeling system does accept scanned data as input.

Most prior art computerized modeling systems typically use polygons, non-uniform rational B-splines (NURBS), or other subdivisions of planar surfaces to represent the shape of a model. However, all three representations have limitations.

Polygon models require a large number of vertices to represent detailed surfaces, particularly when the surfaces are highly curved, textured, or include sharp edges. This makes model generation and editing with polygons cumbersome and time consuming. Because NURBS are topologically restricted, they must be pieced together to form complex shapes. This presents numerous technical and interface challenges, see DeRose et al., "Subdivision surfaces in character animation," Proc. SIGGRAPH '98, pp. 85–94, 1998. While subdivision of planar surfaces does not suffer from the same topological restrictions as NURBS, controlling shape changes, and adding fine detail during editing are difficult. As another problem, all of these modeling techniques are only surface representations—the models are nothing more than hollow shells and nothing is known about interior portions.

Even worse, sculpting of surface representations can lead to models that are not "watertight." For example, seams where different resolution NURBS are joined can separate to form annoying cracks and holes. This means that the sculpted models have to be carefully inspected and edited before a watertight finished product is produced. Watertight models are important for several applications such as rapid prototyping technologies including stereo lithography.

All computerized modeling systems usually perform editing by manipulating control vertices. This requires significant skill and patience, as well as foresight and careful planning to ensure that the models have enough control vertices where detail is desired. For these reasons, computerized modeling systems do not rival the intuitive and expressive nature of clay.

To make the manipulation more intuitive, most modeling systems allow the user to interact with groups of control vertices using a computer implemented (digital) sculpting tool. For example, in MAYA Artisan, NURBS models are modified via a brush tool that manipulates groups of control vertices. Operations for pushing, pulling, smoothing, and erasing the surface are well known, and the brush tool can affect control vertices in a region of diminishing influence around its center, resulting in a softening of the sculpted shape. The amount of detail in the sculpted surface depends on the number of control vertices in the region of the sculpting tool. Finer control requires more subdivision of the NURBS surface, resulting in a less responsive system and a larger model. Often, mesh subdivision is user controlled and preset. It does not adapt to tool selection, or the detail of the sculpted surface. Hence, achieving fine detail in desired regions without excessive subdivision of the surface in other regions requires significant foresight and planning.

SoftImage provides a sculpting interface, called "Meta-Clay," that is similar to the "metaballs" technology as described by Wyvill et al. in "Animating soft objects," the Visual Computer, 2(4):235–242, 1986. Meta-Clay is a density based representation for modeling organic, sculpted objects. This representation produces blobby shapes, and does not represent edges, corners, or fine detail.

Sculpting of parametric models are described by Fowler, "Geometric manipulation of tensor product surfaces," Proc. of the 1992 Symposium on Interactive 3D Graphics, pp. 101–108, 1992, Khodakovsky et al. "Fine Level Feature Editing for Subdivision Surfaces," ACM Solid Modeling Symposium, 1999, and Terzopoulos et al. "Dynamic NURBS with geometric constraints for interactive sculpting," ACM Transactions On Graphics, 13(2), pp. 103–136, 1994. However, each of these suffers from some of the limitations described above, and none attain sculpted results of the quality required for the animation industry.

To address the problems of polygon, NURBS, and other surface subdivision representations, volumetric data structures can be used. These data structures can be generated parametrically or by sampling techniques using, for example, laser or other ranging techniques, or scanners that penetrate the object to be modeled. Volumetric data can represent both the exterior and interior portions of models. The volumetric data are then sculpted by applying digital sculpting tools. The tools modify sample values near where the sculpting tool interacts with the volume. For these reasons, sampled volumes hold more promise as a data structure for digital clay.

FreeForm is a commercial system for sculpting volumetric models. FreeForm includes a three degree-of-freedom haptic input device which uses force feedback to provide the user with a sense of touch when sculpting. Models are represented as regularly sampled intensity values. This greatly limits the amount of detail that can be achieved, and requires excessive amounts of memory. For example, a minimum system requires 512 MB of random access memory (RAM). Intensity values can be low-pass filtered to reduce aliasing artifacts in the sculpted models, resulting in smoothed edges and rounded corners typical in volumetric sculpting systems.

To take advantage of standard hardware rendering engines, volumetric models can be converted to polygon models using a method such as described by Lorensen et al. in "Marching Cubes: A High Resolution 3D Surface Construction Algorithm," Proc. SIGGRAPH '87, pp. 163–169, 1987. However, with large volume sizes, Marching Cubes produces an excessive number of triangles, leading to memory overload and bottlenecks in the graphics rendering pipeline which limit interactivity.

There are a number of publications that describe volume-based sculpting systems including Avila et al. "A haptic interaction method for volume visualization," Proc. IEEE Visualization '96, pp. 197–204, 1996, Baerentzen, "Octree-based volume sculpting Proc. Late Breaking Hot Topics," IEEE Visualization '98, pp. 9–12, 1998, Galyean et al. "Sculpting: An Interactive Volumetric Modeling Technique," Proc. SIGGRAPH '91, pp. 267–274, 1991, and Wang et al. "Volume sculpting," 1995 Symposium on Interactive 3D Graphics, ACM SIGGRAPH, pp. 151–156, 1995.

However, each of these systems suffers from some of the limitations described above, such as large memory requirements, a fixed resolution determined by the volume size, and soft edges. As a result, such systems are of little use to the high-end digital animation industry.

State of the art digital studios, such as Industrial Light and Magic (ILM) and Pixar, have three fundamental requirements for a sculpting system that can be used to design animate digital models, such as animated characters. Animators and artists want digital clay—a medium with the characteristics of real clay, (i.e., expressive in its ability to represent both smooth surfaces and very fine detail, intuitive to sculpt, easy to manipulate, responsive to user input) and the advantages of a digital media that include the ability to undo, script, duplicate, integrate into digital animation systems, and store permanently. The sculpting methods should be able to execute on standard computer hardware at interactive rates, and the system must fit into existing animation production pipelines. That is, the system must be able to read standard 3D representations or 3D scanned data from clay maquettes, and output models compatible with those pipelines.

The limitations of prior art data structures and modeling systems, and the needs of the animation industry have been partially addressed by the introduction of adaptively sampled distance fields (ADFs), as described by Frisken et al. in "Adaptively Sampled Distance Fields: A General Representation of Shape for Computer Graphics," Proc. SIGGRAPH 2000, pp. 249–254, 2000.

There, ADFs are introduced, basic methods for generating, rendering, and sculpting ADFs are described, and a number of applications where ADFs can be used are listed. As an advantage, ADFs store only as much data as required to represent the detail in an object.

Classically, a distance field can be represented as distances, stored in a memory as scalar values. The distances specify minimum distances to surfaces of an object. When the distances are signed, the sign can be used to distinguish between the inside and outside of the object. Zero distance values represent the surfaces.

An adaptively sample distance field (ADF) can be generated by adaptively sampling the object's shape, and storing the sampled distance values in a spatial hierarchy for efficient processing.

Distances at arbitrary points in the ADF can then be reconstructed from the sampled values, and used for computerized processing such as rendering or sculpting. The use of adaptive sampling permits high sampling rates in regions of fine detail, and low sampling rates where the distance field varies smoothly. Thus, ADFs enable high accuracy without excessive memory requirements.

Frisken et al. discuss a basic sculpting procedure for ADFs and outline methods for generating and rendering ADFs. However, in many aspects, the prior art ADF manipulation methods are inadequate for a production system such as required by the animation industry.

Specifically, a bottom-up generation method requires too much memory and too many distance computations, while a top-down method requires time consuming searches for neighbor cells in an octree, and unnecessary repeated recomputation of distance values. Both approaches exhibit poor spatial and temporal memory coherence for cells and distance values. These memory and processing limitations place practical restrictions on the maximum number of ADF levels that can be generated.

To render ADFs, prior art ray casting methods are sufficiently fast for small local updates on a desktop Pentium class system. However, ray casting, as known, is too slow for local updates on low-end systems, such as embedded processors in handheld devices, and woefully inadequate for camera or view changes such as panning, rotation, and zooming. In addition, the prior art ADF manipulation methods (1) do not address easy-to-use user interfaces for digital sculpting (2) do not provide efficient methods for converting ADFs to standard graphical representations, such as polygons (3) do not provide any methods for correcting distance values other than those at the object's surfaces (4) do not support hardware acceleration, and (5) only discrete steps are supported during editing.

However, ADFs could still be an appropriate data structure for use with a quality sculpting system that meets the needs of digital studios if sufficient improvements could be provided. ADFs have a number of advantages for the entertainment industry. For example, ADFs integrate volumes and surfaces into a single representation, thereby potentially reducing the number of independent representations required by production systems. In addition, ADFs could be combined by simple constructive solid geometry (CSG) operations so that individual parts of a model can be separately modeled, and later joined together. This feature could decrease production costs during model design by maintaining libraries of model parts and features to quickly and easily design new models and characters.

SUMMARY OF THE INVENTION

The present invention provides an innovative volumetric sculpting system that uses adaptively sampled distance fields (ADFs) to enable users to have better control while orienting and positioning sculpting tools relative to surfaces of digitized models. Distance values are used to constrain the sculpting tools, and control vertices are used for region-based conversion to triangles during editing of the model. In addition, the sculpted models are always without bothersome cracks and holes making them "watertight."

The invention also provides advanced model generating and editing methods that reduce memory requirements, provide better memory coherency, and reduced computational costs. Also provided are methods for correcting the entire distance field after multiple sculpting operations.

The invention also provides several new rendering approaches that take advantage of hardware acceleration in standard PCs, including fast generation of triangles and surface points. Methods for inputting and outputting models from the system include an improved method for generating ADFs from scanned range images, and a new and very fast method for generating topologically consistent triangle models from ADFs at various levels of detail (LOD).

The invention, as described herein, provides animation artists with an interactive system for sculpting. The system provides the ideal modeling media in the form of digital clay. The system and methods of the invention can represent very high resolution shapes at minimal memory costs, operate with standard computer hardware, and enable easy integration with existing animation production pipelines.

Although the sculpting system is designed to meet the demands of high-end production studios, the system also has applications in other areas of the entertainment industry, such as character design for games and virtual reality environments. The system can also be used for industrial modeling, particularly where the models cannot be generated parametrically. The ability to output variable level-of-detail models with low polygon counts, as required by these applications, enables easy integration of ADF-based models into existing polygon engines. In addition, the modeling methods of the invention can be used by low-end computing devices.

A method for converts an adaptively sampled distance field of a graphics model to a triangle model, The adaptively sampled distance field includes surface cells storing distance values that have corresponding gradients. A vertex is assigned to a center location of each surface cell. The vertices of neighboring surface cells are connected to form triangles while satisfying a predetermined constraint. Then, each vertex is moved, in a single step, to a new location according to the distance value and corresponding gradient of the vertex to substantially conform the triangles to a surface of the model.

BRIEF DESCRIPTION OF THE DRAWINGS

FIG. 15 is a diagram of cell edges used by the procedure of FIG. 14;

DETAILED DESCRIPTION OF THE PREFERRED EMBODIMENT

System Structure and Components

Figure 1:
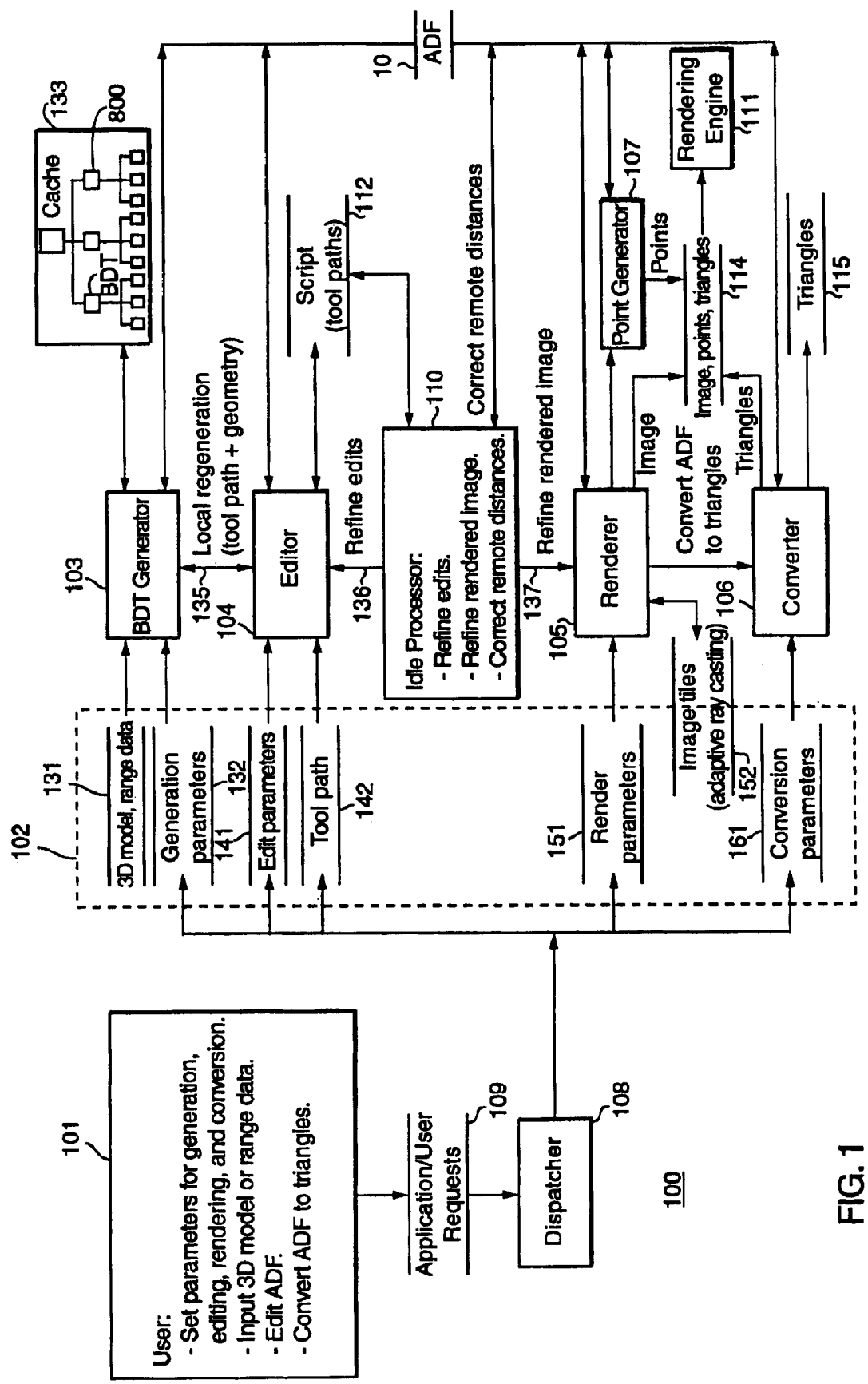
FIG. 1 is a flow diagram of a modeling system according to the invention.

FIG. 1 shows a computerized modeling system 100 according to the present invention. The modeling system, as a basis, uses adaptively sampled distance fields (ADFs) 10 to represent digitized models that can be animated for use by the entertainment industry. The basic data structure of an ADF is described in U.S. patent application Ser. No. 09/370,091 "Detail-Directed Distance Fields" filed by Frisken et al. on Aug. 6, 1999, incorporated herein in its entirety by reference. The ADFs 10 are used to represent the digitized models. They can also be used to represent computer implemented tools that operate on the models. It should be noted that the tools can add as well as remove material.

Basic components of the modeling system 100 include a user interface 101 that provides input data 102 to a bounded distance tree (BDT) generator 103, an editor 104, a renderer 105, a converter 106, a point generator 107, and a dispatcher 108 which responds to application and user requests 109. The system 100 also includes an idle processor 110 described in greater detail below. The output data 114 of the system can be supplied to industry standard rendering engines, such as OpenGL and RenderMan. The output data 114 can include points, triangles, and images.

Data Structures

The input data 102 include: three-dimensional (3D) models or range data 131 and generation parameters 132 for the BDT generator 103; edit parameters 141 for the editor 104, a tool path 142 for the editor 104; render parameters 151 for the renderer 105; and conversion parameters 161 for the converter 106. The BDT generator 103 operates on bounded distance trees 800 stored in a cache 133. The renderer 105 also operates on an intermediate data structure representing image tiles 152 generated by adaptive ray casting. The editor 104 and the idle processor 110 operate on a script 112 representing intermediate stages of the tool path 142. The renderer 105, converter 106, and point generator 107 operate on images, points and triangles 114 to be processed by the rendering engine 111, and the converter 106 generates triangles 115 from the ADFs 10.

System Component and Data Interactions

The input data 102 is specified by a user with the user interface 101. The user sets the parameters 132 for the BDT generator 103, the parameters 141 for the editor 104, the parameters 151 for the renderer 104, and the parameters 161 for the converter 106. The user also selects the 3D model or range data to be processed by the system 100, the edits to the ADFs 10, and how and when the ADFs are to be converted to the triangles 115.

The BDT generator 103 and the editor 104 interact by exchanging local regeneration data 135 that include the tool path and model geometry. The idle processor interacts with the editor to refine edits 136, and with the renderer to refine the rendered image 137. The renderer interacts with the converter to convert the ADFs 10 to triangles 114.

System Operation

During operation of the system 100, the user can start by generating an initial model using CSG operations on standard object shapes such as spheres and boxes, or start by converting a standard 3D model or range data to an ADF. The user then proceeds by sculpting the model using the editor and selectable sculpting tools.

As stated above, the sculpting tools can also be represented by ADFs, or a simple distance function defining the shape of the tool if the shape is simple, for example, spherical. During sculpting, the renderer updates the image tiles 152 while automatically switching between several rendering methods depending on user actions and system capabilities.

During idle-time, the idle processor 110 performs a number of operations including increasing the rendering resolution of the image tiles for the adaptive ray casting, increasing the resolution and extent of edits from the scripted tool paths 112, and correcting distance values for points in the ADFs that are not on the surface being sculpted.

Interactive Sculpting

The system 100 includes interactive software for file manipulation, operation undos, selection, shape smoothing, navigation, and lighting control that are well known to those of ordinary skill in the art. The description herein focuses on the unique methods of the present system for interacting with volumetric data that exploit the properties of the ADFs 10.

Surface Following

Figure 2:
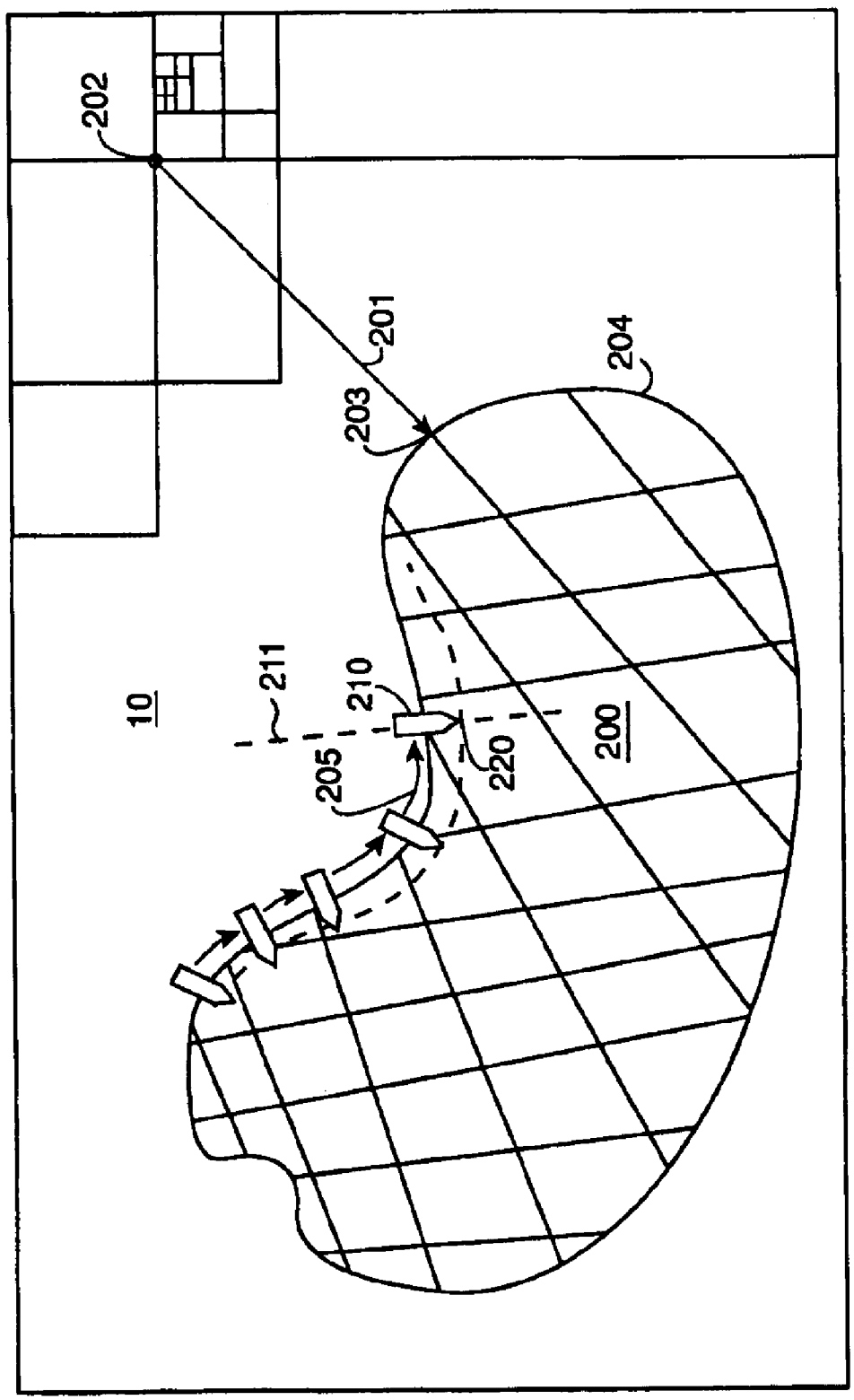
FIG. 2 is a diagram of surface following according to the invention.

As shown in FIG. 2, the system 100 can determine a distance value and a direction 201 from any point 202 in the adaptively sample distance field 10 to a nearest point 203 on the surface 204 of the model 200. The system 100 uses this information to guide the path 205 and orientation of a sculpting tool 210, perhaps manipulated by an input means, e.g., a mouse or a distance function. The system forces the tool to follow the surface of the object. It can also, optionally, orient a principal axis 211 of the tool 210 to be perpendicular to the model's surface 204. Because the object is represented by an ADF and the tool is represented by an ADF or a distance function, it is possible to determine the distance between the surface and the tool, the orientation of the surface, i.e., the direction of the gradient of the object's distance field, and the principal axis of the tool.

Surface following is accomplished by iteratively moving the tool in the direction of the gradient of the distance field of the object. The distance moved is an amount proportional to the distance between the tool and the surface, or from some "offset" surface 220 for constrained sculpting as described below. The offset surface can be external or internal to the surface of the object. At the same time, the principal axis 211 of the tool can be aligned with the surface normal of the nearest point on the surface. Surface following is particularly useful when editing a 3D shape with a 2D input device such as a mouse. It can be difficult to locate the tool accurately on the surface. Surface following enables more intuitive control when sculpting surfaces that are oblique to a viewing direction.

Bezier Tool Paths

Figure 3A:
FIGS. 3a–c are diagrams of editing strokes.
Figure 3B:
Figure 3C:
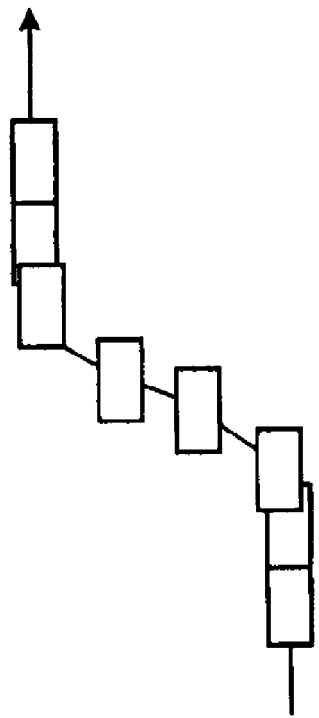

Sculpting can be accomplished by a set of discrete edits along the tool's path. However, as illustrated in FIGS. 3*a–c*, this approach can be inefficient and erroneous resulting in redundant overlapping edits for slow tool movement (FIG. 3*a*), and broken edits for fast tool movement (FIG. 3*b*). If the shape of the tool is axially asymmetric, then the edits can be broken and misaligned when the tool is oblique to the tool's path (FIG. 3*c*).

To address these problems, the system edits the ADFs 10 directly with a swept volume corresponding to the geometry of the tool as the tool moves along a 3D Bezier curve. The system uses a Bezier clipping process to compute distances from the curve, and then uses the tool's geometry to generate the swept volume, see Nishita et al. in "*Ray tracing trimmed rational surface patches*," Proc. SIGGRAPH '90, pp. 337–345, 1990.

For a spherical tool, distances in the swept volume are computed by offsetting the distances to the centerline of the tool path. For tools with rectangular or other shapes, the distance computation is more involved but can still be more efficient than a point-based evaluation. This approach allows two levels of control. First, the Bezier paths can be automatically derived from the user's input strokes and then carved. Second, the Bezier curve can be explicitly drawn onto the surface of the model, and edited using control points before the curve is carved onto the surface.

Scripting of the Tool Path

As an advantage, the system 100 records edit paths in the script 112 during editing for later processing. The scripted paths provide three important features. First, the editing resolution and the extent of the tool influence on the ADF can be limited in order to achieve interactive speeds. When this occurs, the scripted edit paths are used for lazy evaluation of the edits at higher resolutions, and for increasing the extent of the tool influence further into the ADF during idle-time processing. Second, scripted paths provide a history of the editing session, allowing the model to be regenerated on systems with different memory and processing power. Third, the scripted paths, combined with stored intermediate versions of the ADF, enable the system to process multiple undos without excessive storage. In the preferred embodiment, the script is in the form of a character string or binary data defining the parameters of the tool's path.

Dynamic Tools

The system 100 permits the shape of the tool and its function (add-remove) to vary with time/distance traveled, or according to its location on the surface, or according to a description in the tool path. The description can be a procedure which modifies both shape and function based on numerous parameters such as time, distance, gradient, surface complexity, and cell geometry.

Distance-Based Constraints

Figure 4:
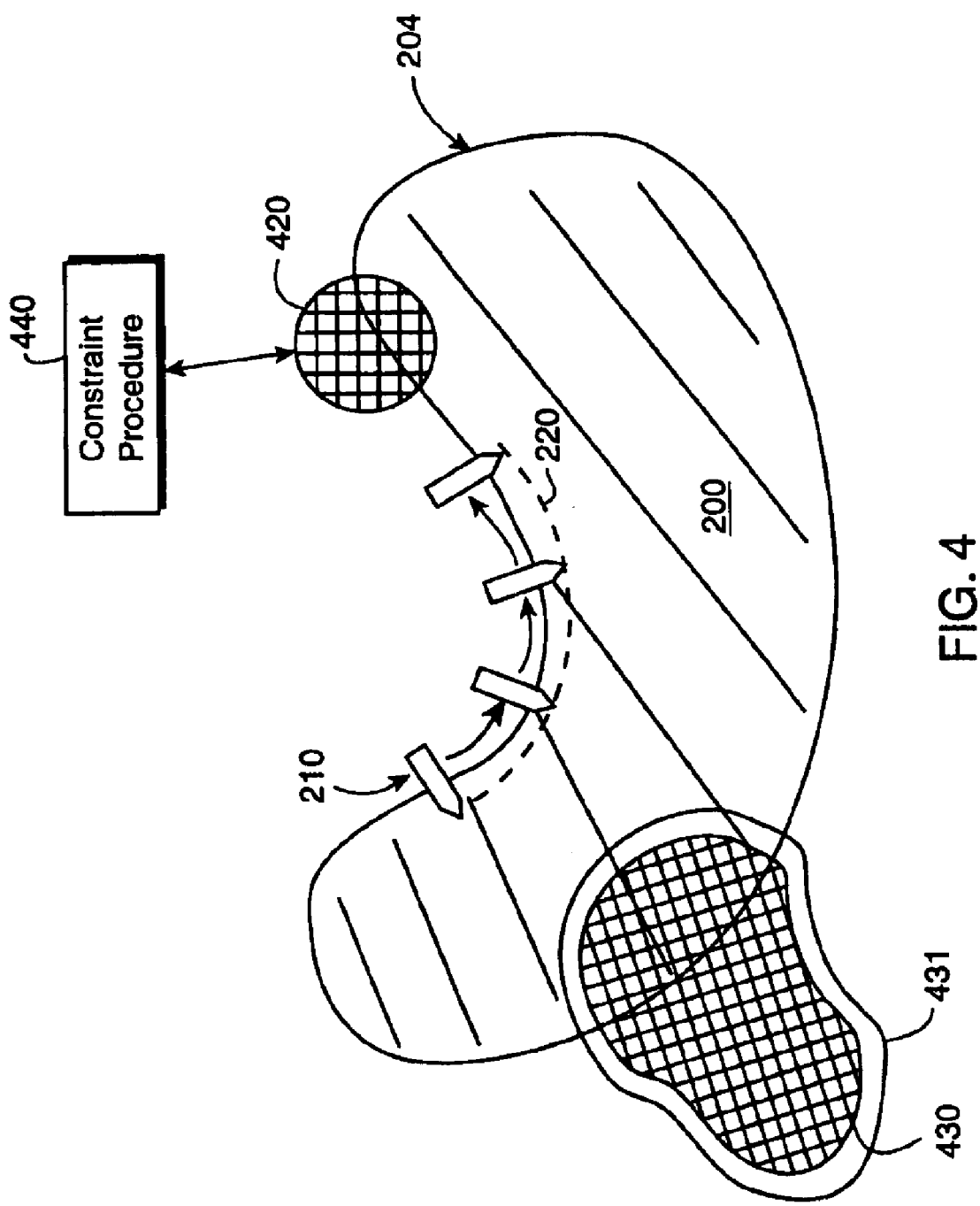
FIG. 4 is a diagram of constrained surface following.

As shown in FIG. 4, the system 100 can provide an enhanced modeling interface because the ADFs 10 represent the distance from the models' surface to any point in space. The tool can be constrained to move along the offset surface 220. Thus, the system can force the tool to remove or add material at a specified depth (internal offset surface), or height (external offset surface) from the original surface. The computation to keep the tool on the offset surface is as simple as it is to keep the tool on the true surface as described above.

In addition, the system can use a digital "mask," 420, also in ADF form or as a traditional distance field. The mask can be used in two ways. First, the mask can be used to prevent the tool from modifying specified 2D or 3D regions of the model. Second, the tool can be used to "cut-away" portions of the mask, and then only the exposed portions of the model are further processed by either adding or removing material.

The mask can be in the form of a "force field" 430, which can also be represented as an ADF. The force field's reconstructed distance field and gradient can provide physical and visual cues, e.g., force feedback for haptics, that indicate tool depths or proximity to the model's surface. Alternatively, the force field can just constrain the editing while the tool is within the "influence" 431 of the force field, that is, the tool is near the mask edges. In addition, multiple masks and force fields can be combined to provide more complex editing constraints. Note, if the mask constrains the tool to move inside the mask region then the force field extends inwards, otherwise the force field extends outwards from the mask.

Applications for Distance-Based Constraints

Distance-based constraints are useful in many applications. As defined by Leler in "*Constraint programming languages, their specification and generation*," Addison-Wesley Publishing Company, 1988, a constraint is a desired relationship among two or more objects. Industrial designs are often considered to be constraint oriented. The constraints of the design usually indicate limitations in the range of possible solutions.

When considering tolerance constraints, which are usually related to a single model or surface, the above definition of constraint must be enhanced. Therefore, in the preferred embodiment of the system 100, a constraint is either imposed on a single model, or represents a desired relationship among two or more models.

An ADF constraint includes at least one ADF, e.g., 420, and a constraint procedure 440 for instantiating that constraint in the system 100. For example, the constraint procedure 440 might absolutely limit the tool from entering the ADF, as for the mask 420, or limit the tool's movement when the tool is within a very small specified distance from the surface, or limit the tool from entering a region defined by the field of the ADF, combined with an explicit function that distorts that field. In addition, constraints can be combined to form a complex constraint system.

One of the novelties in this approach is that constraints can be expressed as 2D or 3D models which are either converted into ADFs or drawn directly as ADFs. This representation of constraints as adaptively sampled distance fields enables constraints to be applied throughout space. Associating a procedure with the ADF permits unlimited flexibility that has particular applications to industrial design. For example, if the system is used to design integrated circuits, then sub-micron precision can be obtained easily by specifying constraints which guide a tool to the desired accuracy.

Surface Following Procedure for Distance-Based Constraints

Figure 5:
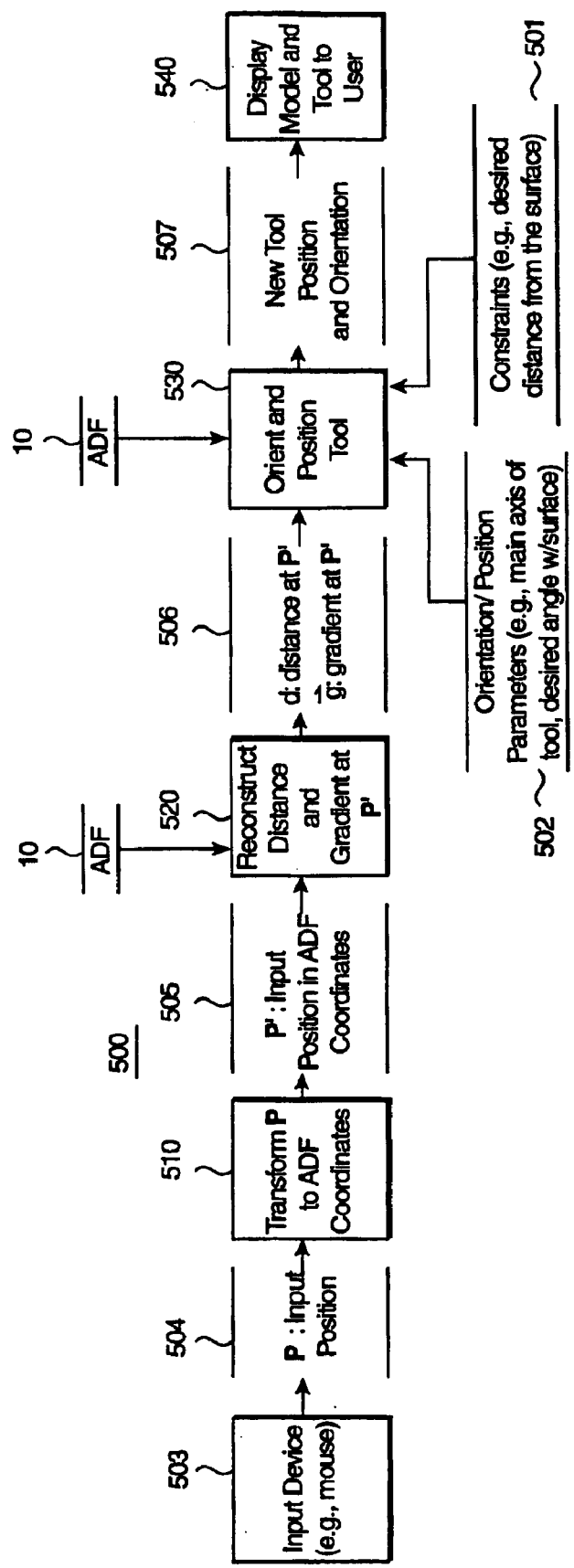
FIG. 5 is a flow diagram of constrained surface following.

FIG. 5 shows a procedure 500 that implements distance-based constraints of the system 100. Input data to the procedure 500 include ADFs 10 for the model, a tool, masks and/or force fields, constraints 501, e.g., desired distance from the surface, and tool orientation and position parameters 502, e.g., principal axis of tool, and desired angle with surface. The model, tool, and constraints are manipulated on a display device with an input device 503, e.g., a mouse.

The mouse specifies some current input position (p) 504. The input position is transformed 510 to p' 505 in the coordinate system of the ADF. The distance and the gradient 506 at p' are reconstructed 520. The tool is positioned and oriented 530 to determine a new orientation and position 507, and the tool is displayed 540 to the user.

Control Point Editing

While digital sculpting provides a powerful and flexible means for digital model design, there are times when control vertex manipulation has its advantages. For example, to puff or pucker a character's cheek, it can be easier to edit a set of control vertices than to alter the shape of the cheek by adding or removing material with sculpting tools.

Figure 6:
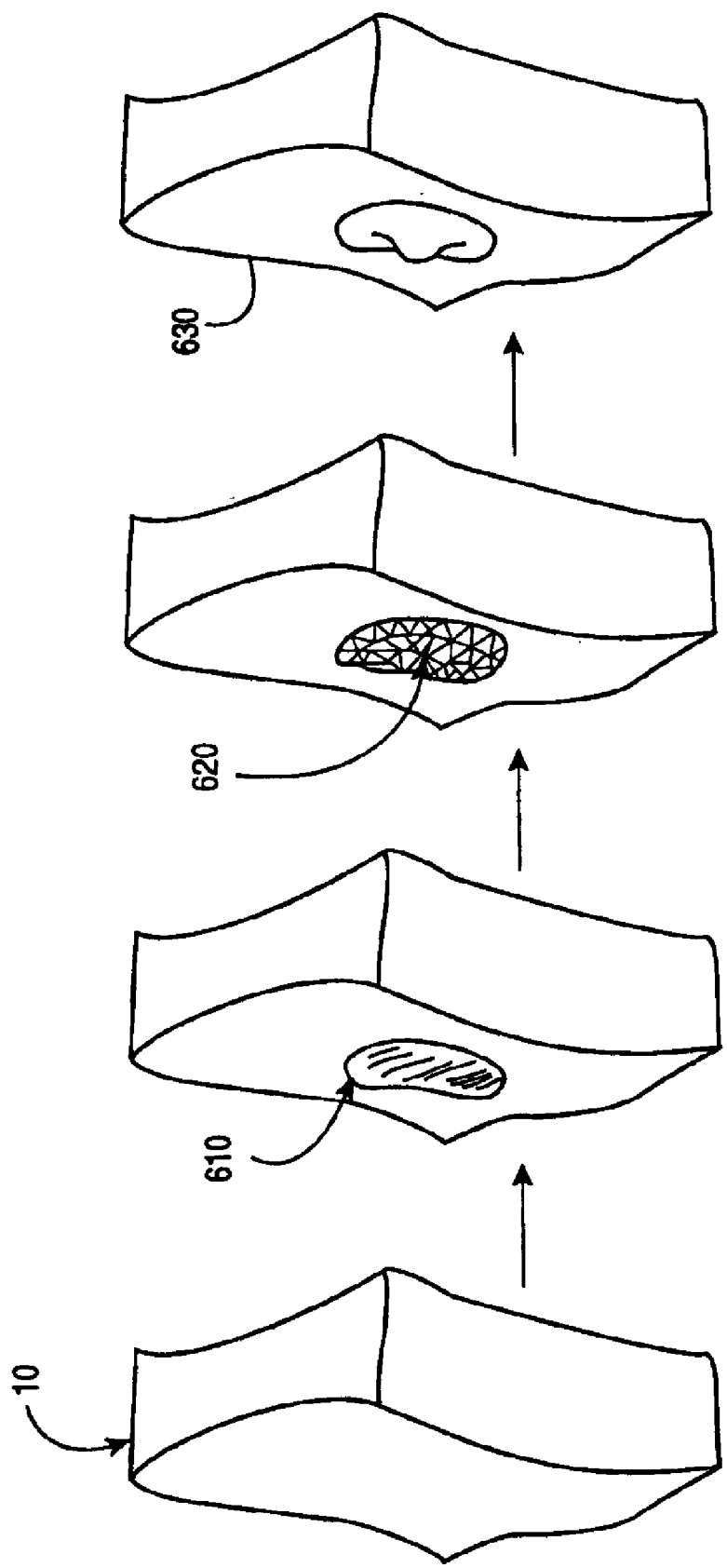
FIG. 6 is a diagram of control point editing.
Figure 7:
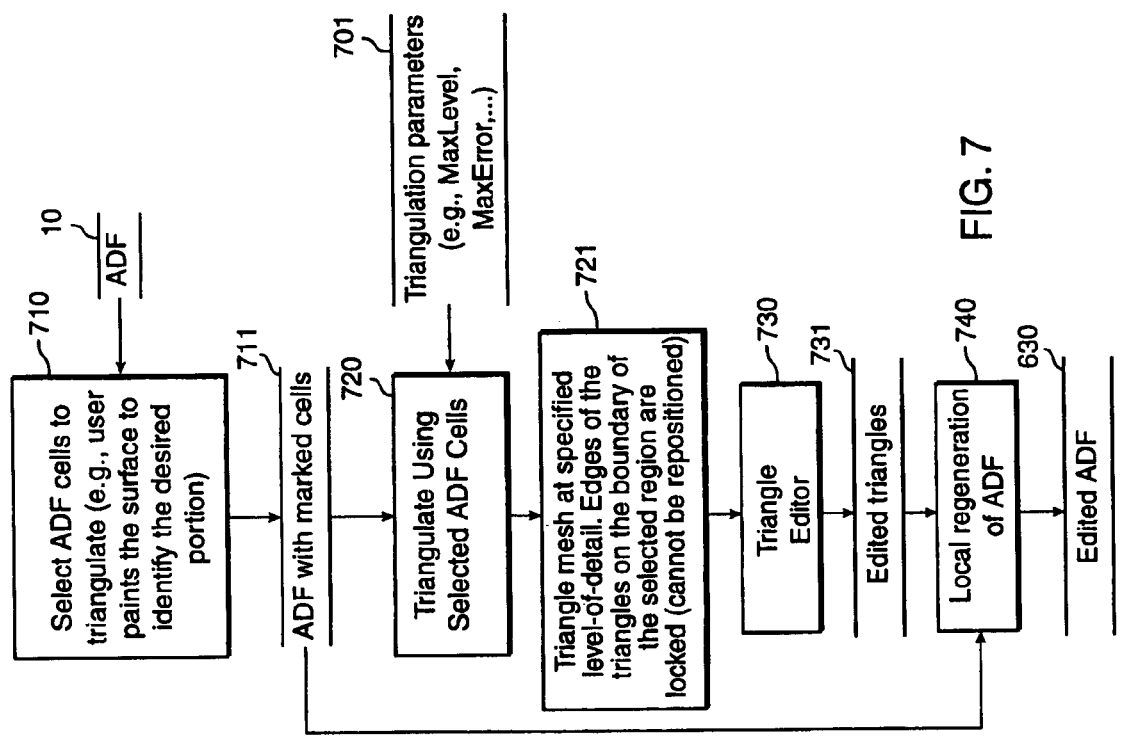
FIG. 7 is a flow diagram of control point editing.

Thus, as shown in FIGS. 6 and 7, the system 100 provides means 700 for selecting a portion 610 of the ADF model 10, and converting the selected portion to a polygon (triangular) model 620 with control vertices at a user controlled level-of-detail, as described below. The control vertices can then be manipulated, and the edited portion 620 of the ADF can be regenerated from the triangle model.

In the control point editing procedure 700, the input parameters are the ADF 10, and triangulation parameters 701. Step 710 selects ADF cells 711 to triangulate, e.g., the user points at the model's surface and identifies the desired portion. The marked cells are triangulated 720 as described in further detail below. The triangle mesh 721, at a specified LOD has an edge on the boundary of the selected portion. The triangle mesh is then edited 730, using any known editing procedure. The edited triangles 731 are locally regenerated 740 to produce the edited ADF 630. During the editing and regeneration, the edge of the selected portion can remain in place to retain a sharp edge, or the edge can be relaxed so that the transition from the selected portion to the rest (unselected) of the surface is smooth.

Bounded Distance Tree Generation and Editing

Frisken et al. outline two methods for generating ADFs. A bottom-up method generates a fully populated octree and coalesces cells upwards when the distance field represented by a cell's eight children is well approximated by the sampled distance values of the cell. A top-down method recursively subdivides cells which do not pass a predicate test comparing distances computed from the model's distance function with distances reconstructed from the cell's sampled distance values at multiple test points.

In practical applications, both of these methods have serious limitations. The bottom-up approach requires excessive amounts of memory and too many distance computations to generate high resolution ADFs, while the recursive top-down approach moves up and down through the octree levels and requires many redundant distance computations and reconstructions. Both approaches exhibit poor memory coherence minimizing any beneficial effects that could otherwise be obtained from caching. Times for generating an ADF with a maximum octree level of eight (level-8 ADF) is on the order of 20 seconds, and 40 seconds for a level-9 ADF. This is for a relatively simple CSG model using the top-down generation method executing on a desk-top Pentium III system. For both methods, generation of ADFs higher than level-9 is impractical due to excessive generation time and memory requirements.

In the present system, the BDT generator 103 balances memory requirements, memory coherence, and computation while constructing the ADFs. Generation times for similar CSG models are reduced significantly to less than one second for a level-8 ADF and about two seconds for a level-9 ADF. This is a 20 times increase in speed over the prior art methods. Better memory utilization and the faster generator enable the system to generate a level-12 ADF in about 8 seconds.

It should be noted that a level-12 ADF represents a resolution range of $1:2^{-12}$, i.e., 1:0.00024. Representing this dynamic range in a regularly sampled prior art volume would require about 70 billion sample values, clearly beyond the capabilities of most general purpose computers, and certainly impossible for embedded processors. In sharp contrast, a typical level-12 ADF requires on the order of 2 to 3 million distance values, a considerable improvement, and well within the capabilities of even small portable devices, such as laptops, personal digital assistants, and wireless communication devices.

Figure 8:
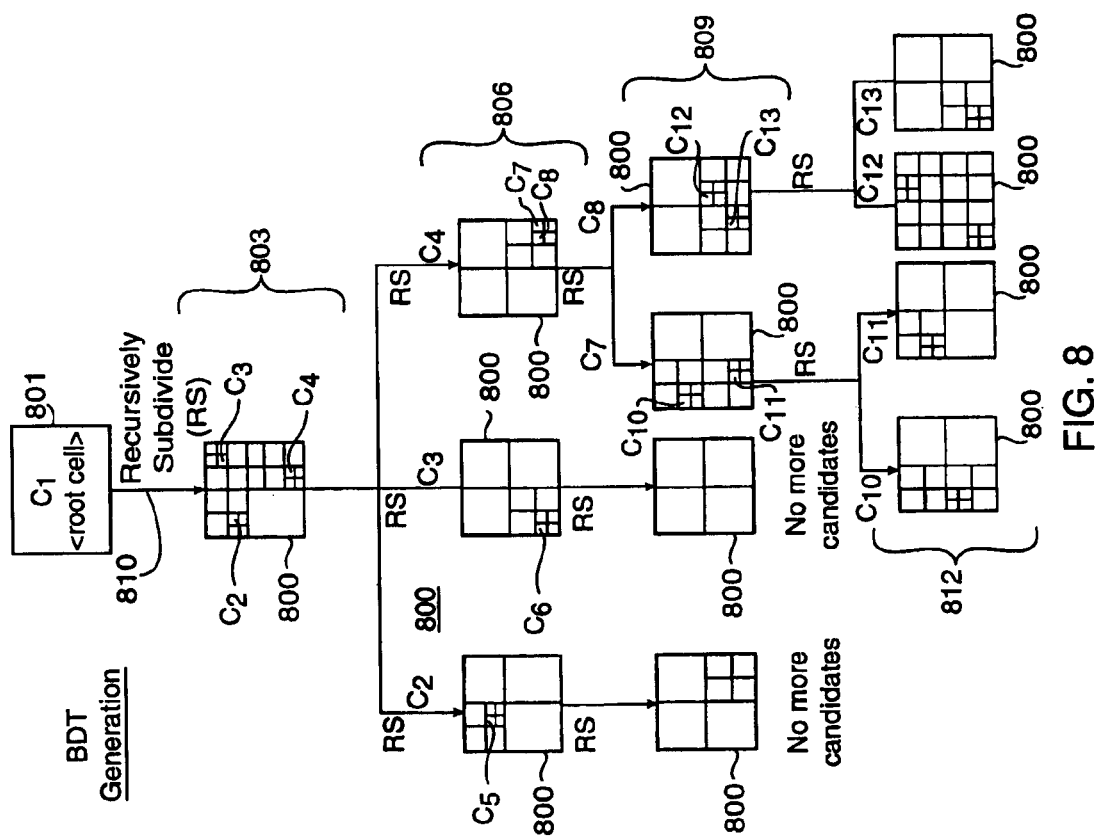
FIG. 8 is a diagram of a bounded distance tree (BDT) at various stages during ADF generation.

As shown in FIG. 8, the BDT generator 103 proceeds in a top-down manner to generate an ADF 10 from a root cell ($C_1$) 801 in layers, applying recursive subdivision and using bounded distance trees (BDT) 800. FIG. 8 shows the octree for a level-12 ADF with layers at level-3 803, level-6 806, level-9 809, and level-12 812. The notation $C_n$ indicates candidate cells for further subdivision. A layer's depth determines the increase in octree depth when the layer is processed. For example, a level-9 octree that is generated with a layer depth of three is generated first to level three, then to level six, and finally to level nine.

Within each layer, the ADF octree is processed one BDT 800 at a time. The BDT can have two, three, or more dimensions. In 2D, the BDT can be considered a "tile," and in 3D a "cube." A BDT is a data structure used to store computed and reconstructed distances, thereby avoiding redundant distance computations for neighboring cells. In the preferred embodiment, the BDT is represented as an array in a cache. As a characteristic, and as shown in FIG.

8, a BDT has a limited depth, and is stored temporarily in the cache while distance values are computed. Each distance value in the BDT has an associated "validity" bit indicating whether or not the distance value is valid. As another characteristic, during normal operation, e.g., editing and sculpting, only "surface" BDTs containing surface cells are processed. BDTs that are entirely composed of interior and exterior cells are not dealt with until the "remote" portions of the distance field are corrected, see FIG. 17 below.

The layer depth sets the size of the BDTs. For example, a layer depth of three, for a 3D model, indicates cubic BDTs of size $2^3 \times 2^3 \times 2^3$. When generating a level-9 ADF with a layer depth of three, up to $8^3$ leaf cells are generated in the first layer. When the second layer is processed, each leaf cell at level three, as produced from the first layer, becomes a candidate for further subdivision and acts as a parent cell of a new BDT. When processing the third layer, each leaf cell at level six, produced from the second layer, becomes a candidate for further subdivision and so on until a maximum specified level of the ADF is reached or no more candidates remain.

As an advantage of the invention, computed and reconstructed distances for each BDT are produced only as needed during recursive subdivision. In addition, the BDT data structure does not use pointers, as in the ADFs 10, thereby greatly reducing the storage required, and enabling the BDTs to be cached to reduce processing time. Furthermore, when the distance values of the BDT are represented as array elements, rather than a pointer-based tree, access to a distance value requires a single, constant-time operation.

Figure 10:
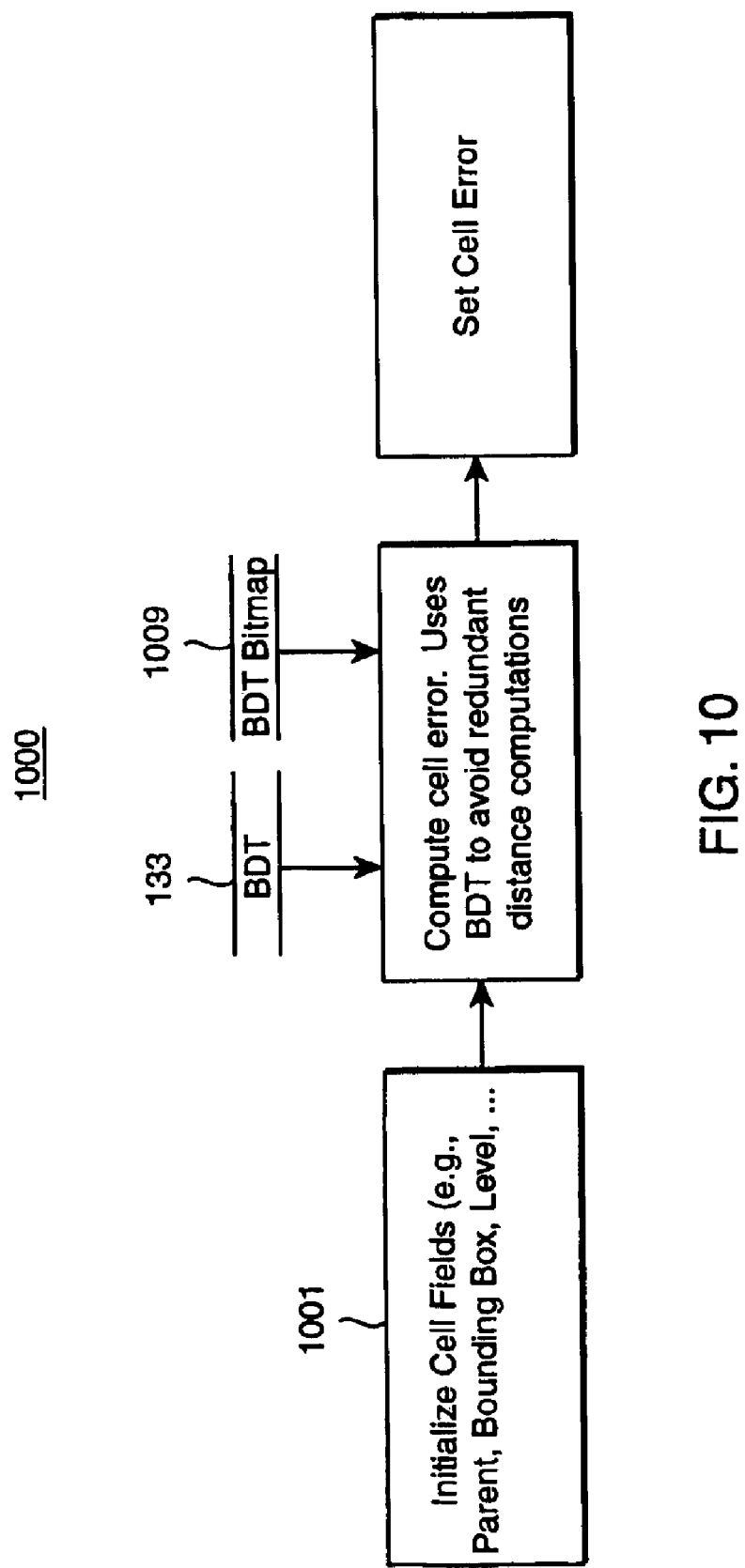

A corresponding bit map 1009 associated with each bounded distance tree 800, see FIG. 10, keeps track of valid distance values in the BDT 800. The bit map ensures that distance values within the BDT are computed and stored only once. There is one validity bit for each distance value in the BDT, i.e., each array element.

After a BDT has been fully processed, valid distances in the BDT are appended to the ADF, and cell pointers to the valid distances are updated in the ADF. Special care is taken at BDT boundaries by initializing the BDT 800 and corresponding bit map 1009 from neighboring cells that have already been processed to ensure that distances are also shared across neighboring cells of different BDTs, again improving performance.

The size of the BDTs can be adjusted to match the size of the cache 133, see FIG. 1. In Pentium class systems, for example, the BDT storing up to $8^3$ distance values works effectively, especially when each distance value only requires two bytes. The use of the bit map 1009 further enhances CPU and cache performance. For example, because the bit map 1009 stores 32 validity bits in a single memory word on a 32-bit computer, the BDT generator can invalidate 32 distance values in a BDT in a single operation. As an advantage, the bounded distance tree data structure is substantially smaller than the data structure for the ADF.

The final cells and distances of the ADFs 10 are stored in contiguous arrays of the main memory to further enhance spatial coherency and performance when processing the ADFs 10 during other system operations such as rendering. These arrays are allocated in blocks as needed during BDT generation. The arrays are truncated to a maximum required size when BDT generation completes. Because the array blocks are contiguous, updating cell and distance value pointers, when an ADF is moved or copied in memory, is both fast and easy.

Figure 9:
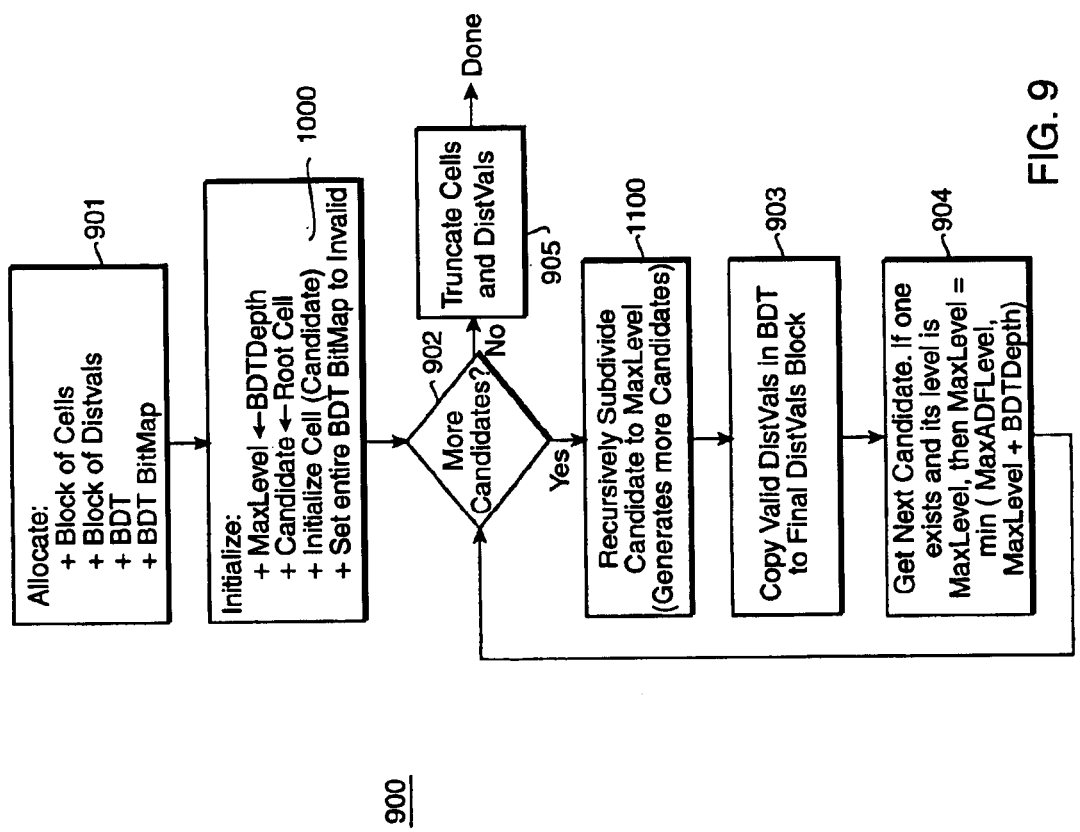
FIGS. 9–11 are flow diagrams of BDT generation.
Figure 11:
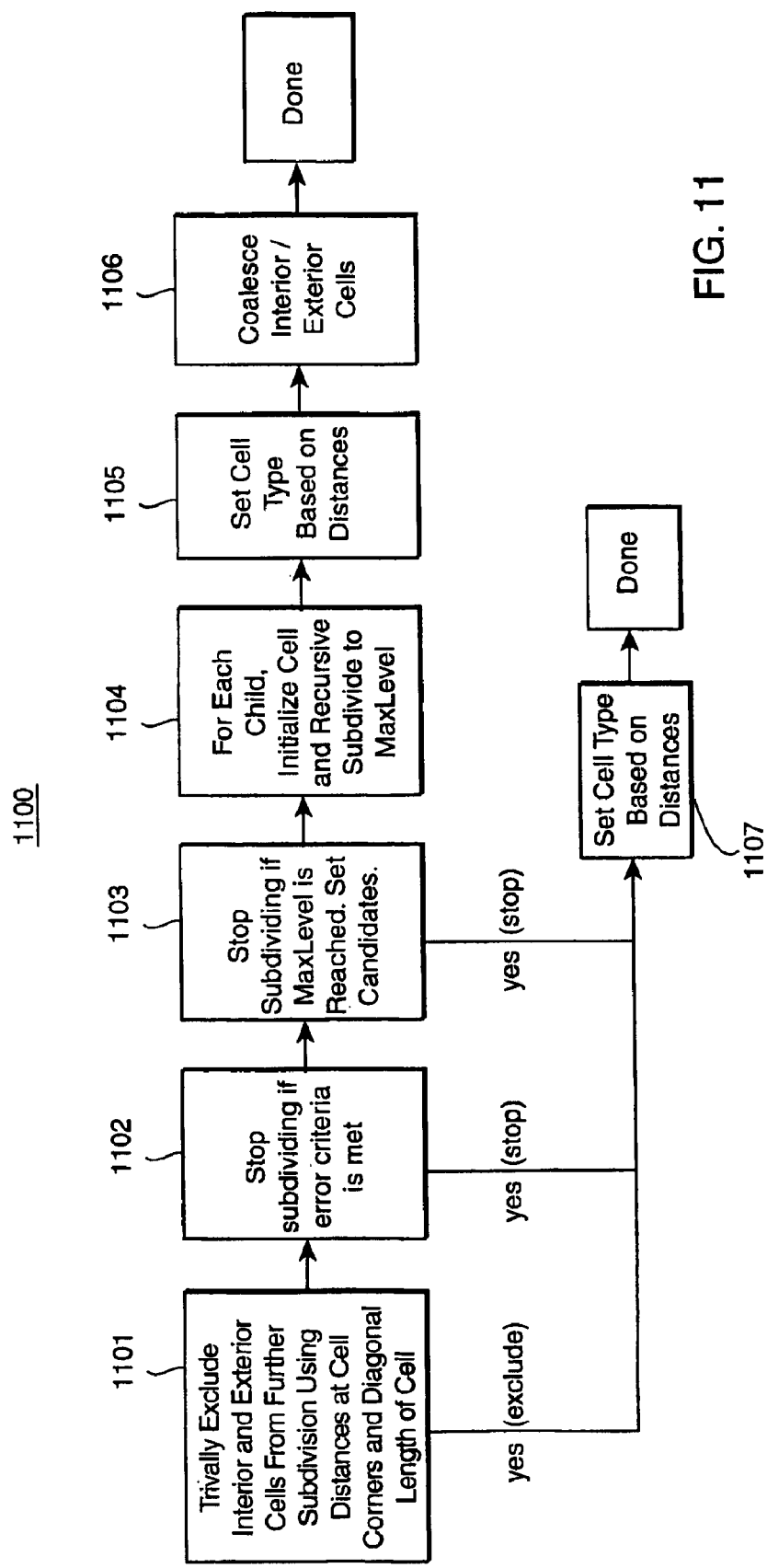

FIGS. 9, 10, and 11 show steps of a software procedure 900 that implements the BDT generator 103. Step 901 allocates blocks of memory for cells, distance values (DistVals), the BDT bit map 1009, and the BDT 800. Step 1000, see FIG. 10, initializes the fields of a cell and computes the cell's error; other processing steps performed with step 1000 include initializing a maximum depth level (MaxLevel), invalidating the bits in the BDT bit map 1009, and setting a candidate cell (beginning with the root cell 801). A candidate cell is a cell which may require further subdivision. Until there are no more candidate cells 902, candidate cells are recursively subdivided 1100, see FIG. 11, to MaxLevel. Valid distance values are copied in step 903, and step 904 gets a next candidate cell. At completion, final cells and distance values are truncated 905 to a predetermined maximum required size.

As shown in FIG. 10, the initializing step 1000 includes a step 1001 to initialize the fields of the cell, a step 1002 that computes the cell's error measure, and a step 1003 which sets the cell's error measure. Note the use of the BDT 800 and its associated bit map 1009 to avoid computing distances already computed.

The recursive subdivision step 1100 includes the following sub-steps. A step 1101 excludes interior and exterior cells, i.e., all cells but surface cells, from further subdivision using the distance values stored for the corners of the cells, and the diagonal lengths of the cells. Step 1102 stops subdividing when the error criterion is met. Step 1103 stops subdividing when the MaxLevel is reached. Step 1104 actually performs the subdivision of the cell, and steps 1105 and 1107 set the cell type (interior, exterior, and surface) based on the cell's distance values. Step 1106 coalesces interior and exterior cells into larger cells whenever possible.

Bounded-Surface Generation

The BDT generation method shown in the FIGS. 8–11 normally only subdivides surface cells. This surface-limited generation reduces memory requirements while assuring accurate representation of the distance field in surface cells. This is sufficient for processing regions immediately adjacent to the surface.

However, for some of the editing methods described above, such as surface following, the use of distance-based constraints, and force feedback, the distance field is required to be accurate for some distance from the surface. Under these circumstances, the BDT generation method 900 is modified so that exterior and interior cells are not coalesced unless the cells satisfy a maximum error constraint whenever the cells are within a bounded region defined by a specified minimum distance from the surface. This bounded-surface generation method is unlike the prior art ADF generation techniques.

Editing

In the present system, sculpting is performed on the ADFs 10 using a local editing process. Compared with prior art ADF processing techniques, as described by Frisken et al., the use of BDTs according to the invention decreases edit times by a factor of 20 and reduces memory requirements for cells and distance values by a factor of two. These advances make it possible to perform highly detailed sculpting in desktop and portable computer systems.

To accommodate fewer resources on smaller computer systems, the system 100 can limit both the sculpted resolution and the volumetric extent of the tool influence to ensure interactivity. As described above, the system 100 maintains a script 112 of sculpting operations and intermediate versions of the ADF. The script 112 can be used during idle-time processing to increase the sculpting resolution and extend the tool influence into the ADFs 10.

Correcting Remote Distance Values

As described above, the ADFs 10 are sculpted by applying CSG operations to the model and tool distance fields. For example, following the positive-inside and negative-outside signed distance value convention of Frisken et al., the sculpted distance at a point, p, for a differencing sculpting tool can be expressed as $dist(p)=min(dist_{model}(p), -dist_{tool}(p))$, and the sculpted distance at p for an additive tool is $dist(p)=max(dist_{model}(p), dist_{tool}(p))$. The use of min/max operators can result in inaccurate distance values in the ADFs 10 at points in the ADF remote from the sculpted surface, as shown in FIGS. 12a and 12b.

Figure 12B:
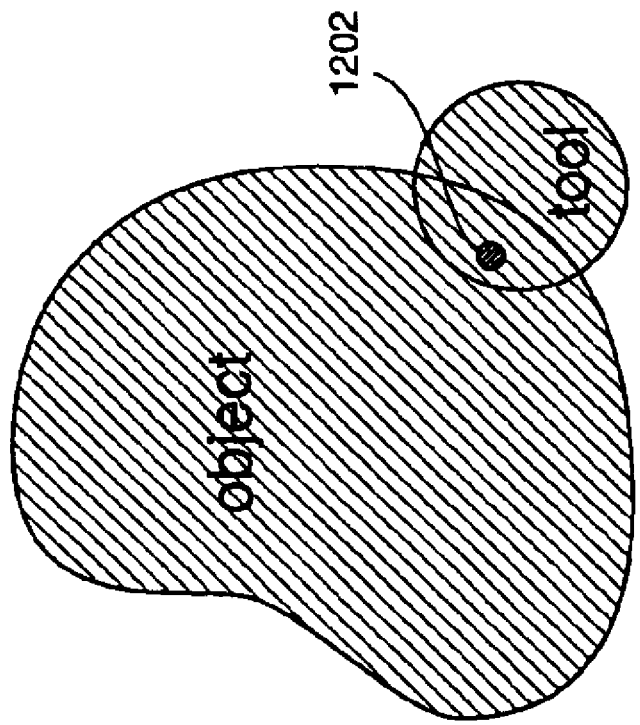
FIGS. 12a–b are diagrams of interior and exterior points of a model.
Figure 12A:
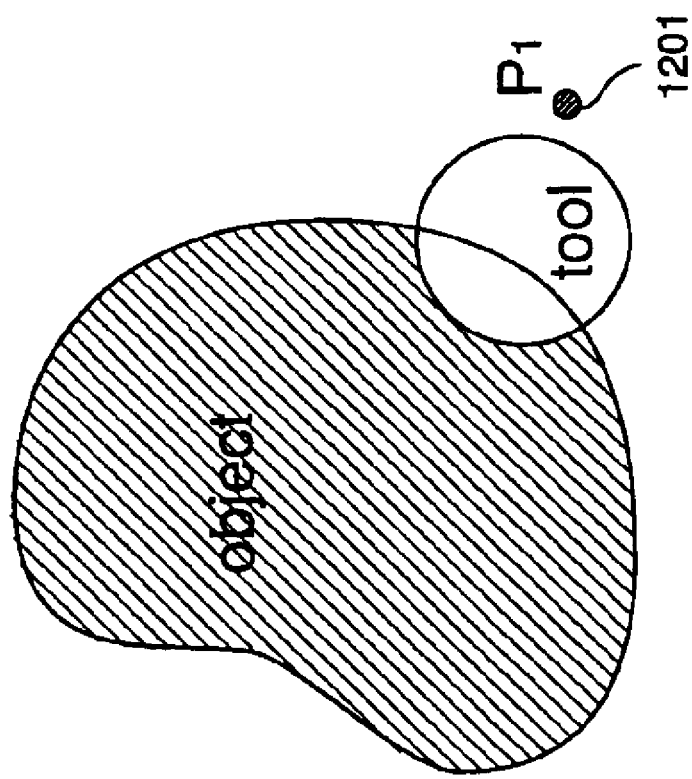

For example, as shown in FIGS. 12a and 12b, a point P1 1201, when using a differencing tool, and the point P2 1202, when using an additive tool, both would be assigned distances to surfaces that do not exist in the sculpted object, resulting in an inaccurate field at these points. When processing requires only a correct representation of the distance field at the surface, e.g., during rendering, these inaccurate values have no effect.

However, some of the editing techniques and applications require an accurate representation of the distance field remote from the surface. For example, when the system is used for industrial design, sub-micron distance accuracies may be required throughout the volume to properly guide a tool along a specified path. Hence, the idle processor 110 corrects the remote distance field during system idle-time. The idle processor 110 can also correct the distance field on-demand in a region-of-focus, for example, near the working surface of the sculpting tool, to reflect the fact that material is being removed or added.

There are a number of approaches available for correcting the remote distance field given accurate distances near the model's surface. A fast marching method, derived from level set techniques, can be used to propagate distances outward from a narrow band of correct values near the surface. Another approach holds distance values at the zero-valued iso-surface and the distance field boundaries constant, and uses simulated annealing to smooth out the field in between. Neither of these methods are designed for adaptive distance fields, and both methods are too slow for interactive editing.

Figure 17:
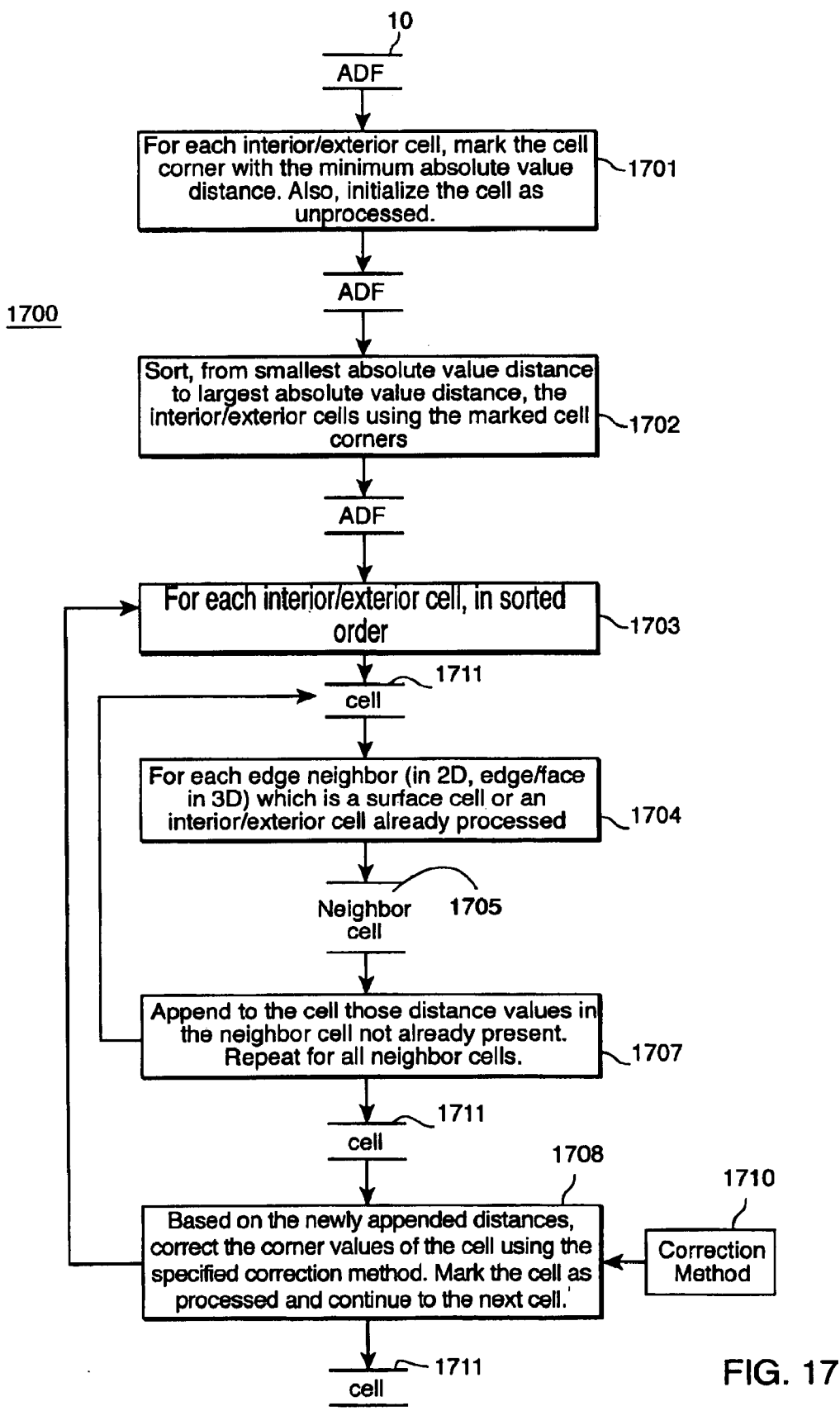
FIG. 17 is a flow diagram of an ADF correction method.

FIG. 17 shows a method 1700 for correcting remote distance values according to the invention, for example, during idle processing 110. Step 1701 marks, for each interior/exterior (non-surface) cell, the cell corner having the minimum, absolute value, distance value. Each non-surface cell is also marked as unprocessed. Note, it assumed that the distance values of the surface cells are always correct for a particular error measure, and normally do not need to be corrected. However, it may be desired to change the error measure, for example, for large cells through which the surface passes. In this case, these large surface cells can be selected for "correction."

Step 1702 then sorts the interior/exterior cells into ascending order using the marked minimum, absolute value, distance values as the sort key. Step 1703 processes the interior/exterior cells in that sorted order.

Step 1704 examines each edge of each interior/exterior cell 1711 and determines the neighbor cells 1705 that share the edge and that are either a surface cell or a processed cell, and then step 1707 appends any missing distance values on the neighboring cell's edge to the shared edge of the interior/exterior cell 1711. Note, distance values can appear anywhere on the shared edge because cells are of varying sizes.

Then, step 1708 sets the corner values of the interior/exterior cell 1711, using the newly appended distance values, according to one of the correction methods 1710 described below. Finally, step 1708 marks the cell 1711 as processed, and continues with the next sorted interior/exterior cell until all interior/exterior cells have been processed.

Correction Method 1

Mark each cell corner vertex as "free" or "fixed." In one embodiment of the invention, a corner is fixed only if it is a corner shared with a neighboring surface cell, otherwise it is free. In another embodiment of the invention, a corner is fixed if it is a corner shared with a neighboring surface cell, or processed cell, otherwise it is free. Then, determine the number of appended distance values associated with each corner. An appended distance value is associated with a corner when it is located on an edge connected to that corner, and lies anywhere between the corner and the edge's midpoint. Next, determine the corner C with the largest number of associated distances. Then, divide the cell into a uniformly sampled grid at a specified resolution. In a preferred embodiment, the memory required to represent the grid fits into the CPU's cache, thereby maximizing performance. Last, perform a Euclidean distance transform on the regular grid propagated from the corner C and correcting only the free corners of the cell, see Cuisenaire, "*Distance Transformations: Fast Algorithms and Applications to Medical Image Processing,*" Ph.D. thesis, Universite Catholique de Louvain, 1999.

Correction Method 2

Determine the nearest newly appended distance D for each free corner. Then, for each free corner C, determine the Euclidean distance N to its nearest newly appended distance D. If the distance at C is outside the range defined by the distance D and the distance N, then set the distance at C to this range.

Correction Method 3

Same as Method 2, but instead of using the nearest newly appended distance for each free corner, use all of the newly appended distances to correct each free corner.

Correction Method 4

Use the newly appended distances to derive a corrected distance at every free corner using extrapolation of distances along an edge or extrapolation of distances throughout the distance field.

Selecting Interior/Exterior Cells for Correction

In one embodiment of the invention, step 1701 selects all interior/exterior cells. In another embodiment of the invention, step 1701 selects only those interior/exterior cells within a specified distance from the surface. In yet another embodiment of the invention, step 1701 selects only those interior/exterior cells which are immediate neighbors to surface cells. In yet another embodiment of the invention, step 1701 selects only those interior/exterior cells which are within a specified region, where the region is determined by input from a user, e.g., the location indicated by a mouse event. For some applications, only interior OR exterior cells require correction. In those cases, the invention limits step 1701 to select only the specified cell type, i.e., interior OR exterior.

Selecting Interior/Exterior Cells To Process During BDT Generation

Similar criteria listed above for selecting interior/exterior cells for correction, can be applied to selecting which interior/exterior cells are forced to pass the predicate test during BDF generation. The predicate test determines if a cell's reconstruction method accurately represents the distance field, see Frisken et al. In one embodiment of the invention, the BDT generator does not require the interior/ exterior cells to pass the predicate test (surface-limited generation). In another embodiment of the invention, the BDT generator forces interior/exterior cells within a specified distance from the surface to pass the predicate test (bounded-surface generation). In yet another embodiment of the invention, the BDT generator forces interior/exterior cells which are within a specified region to pass the predicate test, where the region is determined by input from a user (e.g., the location of mouse events).

Fast Rendering

Fast Global Rendering

The system 100 according to the invention also includes methods for converting the ADFs 10 to triangle and point models so that the system can be integrated with standard hardware and software implemented rendering engines. Given current standard hardware, such as the NVIDIA GeForce2, these conversion methods provide truly interactive manipulation of ADFs. For triangles, the ADF is converted to a triangle model that can be rendered using the OpenGL rendering engine 111, taking advantage of hardware triangle rasterization available on many computer systems. The method for converting the ADF to triangles is described below.

Conversion times are quite fast: the system 100 can generate a triangle model with 200,000 triangles from a level-9 ADF in 0.39 s on a Pentium IV class processor. Models with lower LODs can be generated even faster, e.g., in less than 10 ms for a 2000-triangle model. Thus, triangle models can be generated on-the-fly with imperceptible delays when navigation tools are selected, permitting fast global rendering while panning, zooming, or rotating the camera.

Alternatively, the system can use point-based rendering for global view changes, taking advantage of the current trend in computer graphics towards hardware-assisted point rendering as described by Rusinkiewicz et al. in "*Qsplat: A Multiresolution Point Rendering System for Large Meshes*," Proc. SIGGRAPH '00, pp. 343–352, 2000.

In the preferred embodiment, the system 100 renders points using the OpenGL rendering engine 111. The point generator 107 can produce 800,000 Phong-shaded points in 0.2 seconds, and less than 0.12 seconds for unshaded points when shading is performed by the rendering engine 111. The points can be rendered interactively on desktop systems and, like triangle models, the points can also be generated on demand when navigation tools are selected.

The availability of the distance field and the octree data structure give ADFs unique advantages for generating points. For example, a point randomly generated within a cell can be trivially projected onto the surface in one step using the distance value and gradient at that point. Furthermore, the cell size can be used to determine both the number and size of points to be generated in that cell, thereby enabling multi-resolution rendering methods.

Because point generation is very fast, the system can also use view-dependent point generation that culls back-facing cells and back-facing points, and that uses the gradient in the cell to generate more points on silhouette edges.

Fast Local Rendering

The present system uses two methods to locally update the image in the sculpted region depending on system resources: local triangle generation with hardware rendering, and adaptive ray casting for software-based rendering. While point generation is fast enough for local editing, point models do not represent fine sculpted detail in the image as well as triangles or ray casting. Therefore, point models are not utilized for fast local rendering.

Local Triangles

When the ADFs 10 are converted to triangle models for hardware rendering and there is sufficient memory to maintain both the ADF and a triangle model, the system can locally update these models during sculpting. To enable local updating, triangles are indexed according to the cells from which they are generated. When a cell is affected by sculpting, its associated triangles are deleted and new triangles are generated, on-the-fly, during the sculpting process. This method is very fast but requires additional memory per cell for triangle indexing as well as memory for maintaining the dynamic triangle model.

Adaptive Ray Casting

The system 100 provides ray casting for high quality rendering of the sculpted surface. When this method is used during sculpting, the image is updated locally within the region affected by the tool.

For applications that cannot perform software-based ray casting fast enough for interactive updating, the system 100 uses an adaptive ray casting approach 152 to produce an image representation of the model at a particular viewpoint. The ray casting approach is an extension of directional coherence maps (DCM) described by Guo in "*Progressive Radiance Evaluation Using Directional Coherence Maps*," Proc. SIGGRAPH '98, pp. 255–266, 1998.

The image region to be updated is divided into a hierarchy of image tiles, and subdivision of the image tiles is guided by a perceptually based predicate. Pixels within image tiles that have not been fully subdivided are bi-linearly interpolated to produce the image.

For each image tile, rays are cast into the ADF 10 at tile corners and intersected with the surface using a linear intersection method. The predicate used to test for further subdivision is based on a method described by Mitchell in "*Generating antialiased images at low sampling densities*," Proc. SIGGRAPH '87, pp. 65–72, 1987.

Mitchell individually weights the contrast in red, green, and blue channels, and the variance in depth-from-camera across the image tile. The adaptive ray casting approach 152 according to the invention typically achieves a 6:1 reduction in rendering times over casting one ray per pixel, and more than a 10:1 reduction when the image is super-sampled for anti-aliasing.

Adapting the Sculpting System to a Character Animation Pipeline

Any sculpting system that uses a novel data representation for digital model design is useless to a production system unless the sculpting system can be integrated with existing rendering pipelines. These pipelines can be extensive, particularly in an animation studio. Hence, the system 100 inputs models from several standard types of representations including triangle models, implicit functions, CSG models, Bezier patches and scanned data, and outputs triangle models. Converting most of the above representations to ADFs is described by Frisken et al.

This description focuses on two important new developments: a method for generating ADFs from scanned range data which advances the state of the art, and a method for triangulating ADFs that generates topologically consistent LOD triangle models in a fraction of a second.

Input from Range Data

There are several commercial systems available for converting scanned data to triangle models. One approach for importing ADFs into the system would be to convert the scanned data to triangle models and then convert the triangle models to the ADFs 10. However, experience indicates that the triangle models produced by the conversion from scanned data are often problematic, containing holes, flipped triangles, and overlapping surfaces. Instead, the present system generates the ADF 10 directly from the scanned data.

Several recent research papers have presented methods for converting scanned data to triangle models that make use of signed distance fields for more robust, watertight surface reconstructions. For example, the method as described by Curless et al. in "*A Volumetric Method for Building Complex Models from Range Images*," Proc. SIGGRAPH '96, pp. 303–312, 1996, is the basis for the data conversion method used by the Cyberware scanning system. Wheeler, in "*Automatic Modeling and Localization for Object Recognition*," Ph.D. thesis, Carnegie Mellon University, 1996, describes a method that uses a true Euclidean distance function, and a more volume-centric approach.

There, the scanned data consist of a set of overlapping 2D scanned range images taken from different viewpoints. Each range image is converted to a range surface triangle mesh, and all of the triangle meshes are imported into the same coordinate system. Wheeler then generates a 3-color octree of the distance field in a top-down manner by computing the signed distance from volume elements to each range surface, and combines the distances using a probability-weighted function.

The probability function depends on the angle of each contributing triangle with the original scan direction, the location of the triangle relative to the edge of its scanned image, the degree of agreement between distances computed for overlapping range surfaces, and possibly other factors. As a last step, the Marching Cubes method of Lorensen et al. is applied to all the boundary leaf cells to generate a closed, assuming it makes use of volume boundaries, watertight triangle surface from the signed distance volume. The problem with Wheeler's approach is that all cells containing the model's surface are subdivided to the same octree level, thereby increasing memory requirements and processing time, and also significantly increasing the number of triangles generated using Marching Cubes.

The system 100 adapts and enhances Wheeler's method for the ADFs 10. His top-down generation of a three-color octree is replaced by the BDT generation as described above. In the ADFs 10, boundary cells are represented as a tri-linear field and consequently do not require subdivision in flat or near-flat regions of the surface, resulting in a significant savings over the three-color octree in both memory requirements and the number of distance computations.

After the scanned data are imported into the system, the sculpting system can be used to correct problems in the model. The problems can be due to occluded regions, detail lost because of resolution limits or scanner noise, and rough or broken surfaces at seams between range images. Finally, when desired, the ADF 10 can be converted into a triangle model using the approach described below.

As another advantage of the invention, the system 100 generates significantly fewer triangles than the prior art methods because there are significantly fewer cells in the ADFs 10 than in the prior art three-color octrees. Furthermore, since the ADFs 10 are a hierarchical data structure which support the generation of triangles at a specified level-of-detail, see below, the system 100 can produce a triangle model whose size is tuned specifically for an application.

Figure 13:
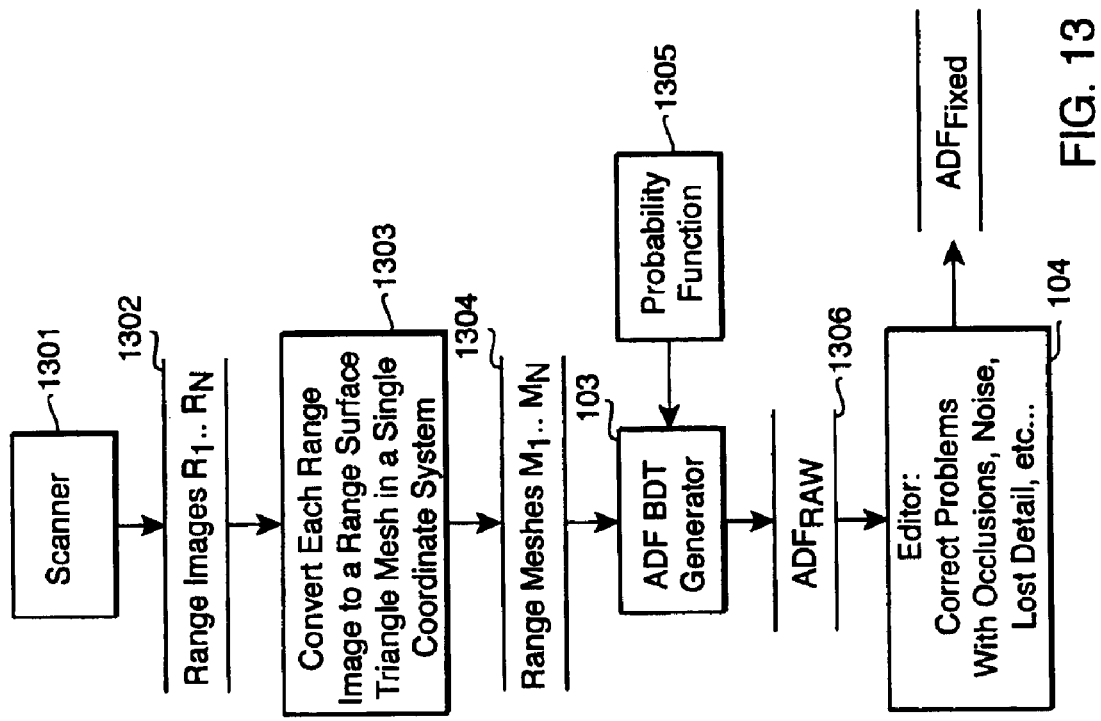
FIG. 13 is a flow diagram of a scan acquisition procedure.

FIG. 13 shows a method 1300 for inputting scanned data from a scanner or range finder 1301. The scanner produces range images $(R_1, \ldots, R_N)$ 1302. The range images are converted 1303 to range meshes 1304 in a single coordinate system. Using a probability function 1305, the range meshes are converted to the ADF 1306 using the BDT generator 103. The probability function determines the contribution (weight) of each vertex in each mesh to the corresponding cell in the ADF. The editor 104 can then be applied to correct problems with occlusions, noise, lost detail, etc., to produce the ADF 10.

Conversion to Triangles

The present system 100 also provides a new method for triangulating the ADFs 10 for rendering, control point-based editing, and conversion to output models that can be integrated into an existing animation pipeline. The triangulation method produces topologically consistent triangle models from an implicit function sampled on an adaptive grid, such as the ADF's octree. The method is very fast and can produce triangle models in real-time. The method can be used in conjunction with the ADF data structure to produce LOD models as described below.

Unlike the prior art surface net approach, see citation below, the enhanced method in the present system generates a triangle mesh from distance values sampled on an adaptive grid. This presents a special problem because neighboring cells in the ADF can have largely varying sizes. This means that vertices can appear almost anywhere on the common edges of neighboring cells. Connecting these unpredictably placed vertices, in real-time, to form "quality" triangles is heretofore an unsolved problem.

The new method is based on a surface net method that was developed as an alternative to Marching Cubes for building globally smooth but locally accurate triangle models from binary volume data sampled on a regular grid, see Gibson, "*Using distance maps for smooth surface representation in sampled volumes*," Proc. 1998 IEEE Volume Visualization Symposium, pp. 23–30, 1998. However, that method uses an iterative energy minimizing process, while moving triangle vertices. That takes a considerable amount of time. In contrast, the new method according to the invention moves vertices to be substantially on the surface of the model in a single step.

The present method produces triangle vertices that lie on the model's surface, and "good quality" triangles, i.e., triangles that are close to equilateral. Further, as described below, the new method easily deals with the crack problem typically associated with adaptive grids. In other words, the new method produces triangle models that are watertight.

The basic three steps of the method are as follows.

First, each boundary (surface) leaf cell of the ADF is assigned a vertex that is initially placed at the center location of a cell.

Second, vertices of neighboring cells are connected to form triangles using the following constraints to produce a topologically consistent "watertight" mesh:

(1) all triangles are connected by vertices of three neighboring cells that share a common edge, hence, triangles are associated with cell edges; and (2) a triangle is associated with an edge only if that edge has a zero crossing of the distance field, i.e., the surface intersects the edge.

Third, after all of the triangles have been formed, triangle vertices are moved towards the cell's surface, i.e., in the direction of the ADF gradient, with a single step size equal to the distance value.

To improve the accuracy and geometry of the mesh, triangle vertices can be moved over the surface, towards neighboring vertices, to improve the overall quality of the triangles.

Figure 14:
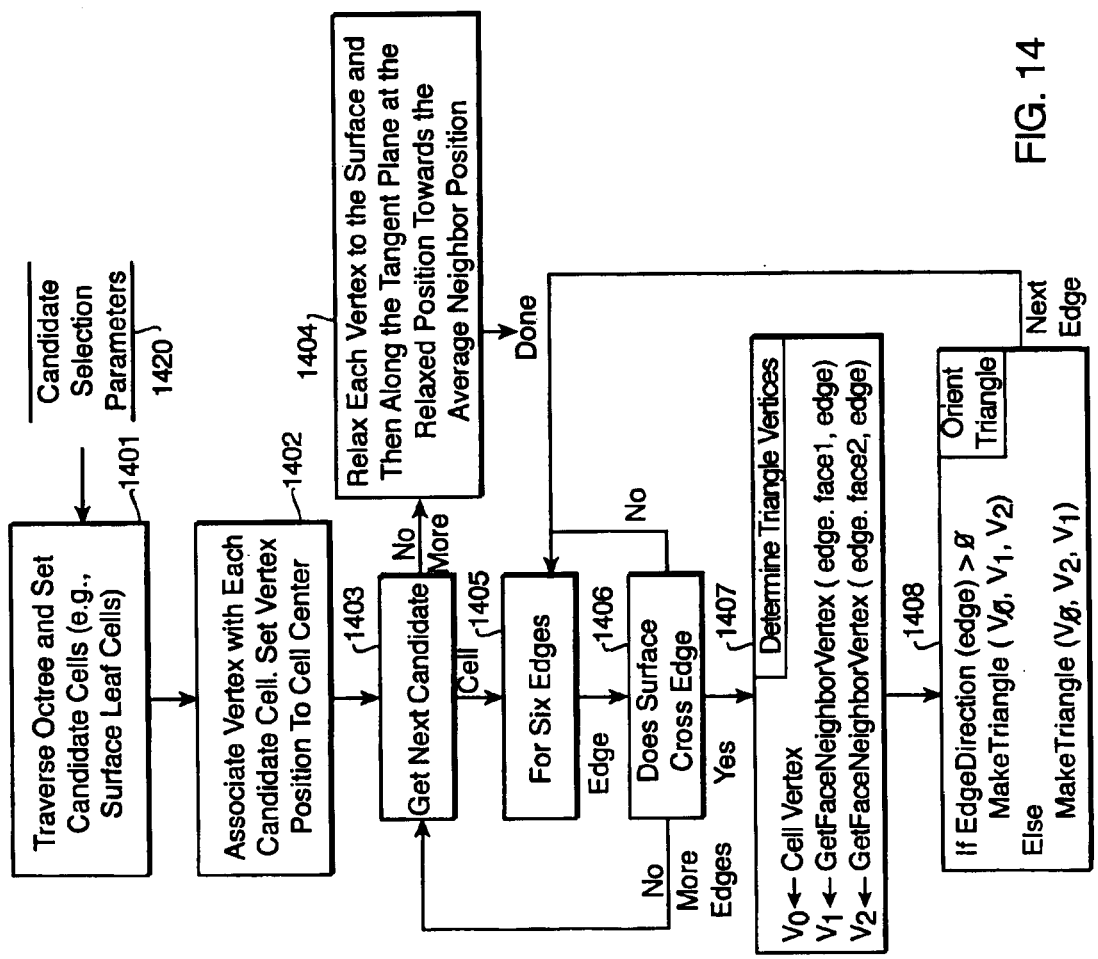
FIG. 14 is a flow diagram of a triangulation procedure.

The basic steps of the preferred triangulation method 1400 are shown in FIG. 14. Step 1401 traverses the ADF octree used to store the data values of the ADF 10 to select candidate cells using candidate selection parameters 1420. In one embodiment of the invention, the candidate selection parameters 1420 specify that all boundary leaf cells be selected as candidate cells. In another embodiment of the invention, the candidate selection parameters 1420 specify that only those boundary leaf cells whose maximum error measure satisfies a user-specified threshold are selected as candidate cells. Cells below the selected cells in the ADF octree hierarchy are ignored. In another embodiment both the depth in the hierarchy, and the error measure can be used to select candidate cells.

Step 1402 associates vertices with each candidate cell, and sets the vertices to the center of the cells. Step 1403 determines if there are any more candidate cells to be processed. If not, then step 1404 relaxes each vertex towards the surface of the cell in a direction towards the "average" neighboring vertex, and along a tangent plane containing the relaxed position. Otherwise, for each of the six edges (step 1405), step 1406 determines if the surface crosses an edge. If true, step 1407 determines the vertices V0, V1, and V2 of the triangle associated with the edge, see description below, and step 1408 determines the triangle's orientation from the edge.

In step 1407, vertex V0 is set to the cell's associated vertex, typically the cell's center point. The vertices V1 and V2 are determined by the method getFaceNeighborVertex( ). Note, the edge has two neighboring faces, face1 and face2. To determine the vertex V1, getFaceNeighborVertex( ) takes the edge and face1 as input, and sets the vertex V1 to either the vertex of the cell's face-adjacent neighbor if the face-adjacent neighbor is the same size or larger than the cell, or else, the vertex of the unique child cell of the face-adjacent neighbor that is both adjacent to the face and has a zero-crossing on the edge. Similarly, to determine the vertex V2, getFaceNeighborVertex( ) takes the edge and face2 as input, and sets the vertex V2 to either the vertex of the cell's face-adjacent neighbor if the face-adjacent neighbor is the same size or larger than the cell, or else, the vertex of the unique child cell of the face-adjacent neighbor that is both adjacent to the face and has a zero-crossing on the edge.

FIG. 15 shows one possibility of considering only six out of twelve edges for a 3D cell, e.g. the edges meet at opposing diagonal corners 1501–1502.

Most prior art methods for triangulating sampled implicit functions generate triangle vertices on cell edges and faces, see for example, Bloomenthal, "Polygonization of Implicit Surfaces," Computer Aided Geometric Design, 5(00): pp. 341–355, 1988, and Karron et al. "New findings from the SpiderWeb algorithm: toward a digital Morse theory," Proc. Vis. in Biomedical Computing, pp. 643–657, 1994.

Figure 16B:
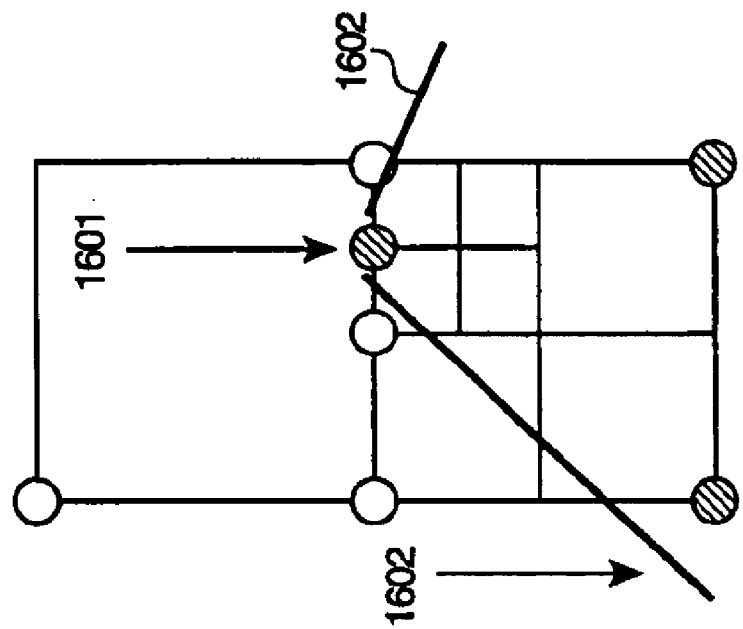
FIGS. 16a–b are diagrams of cracks between edges.
Figure 16A:
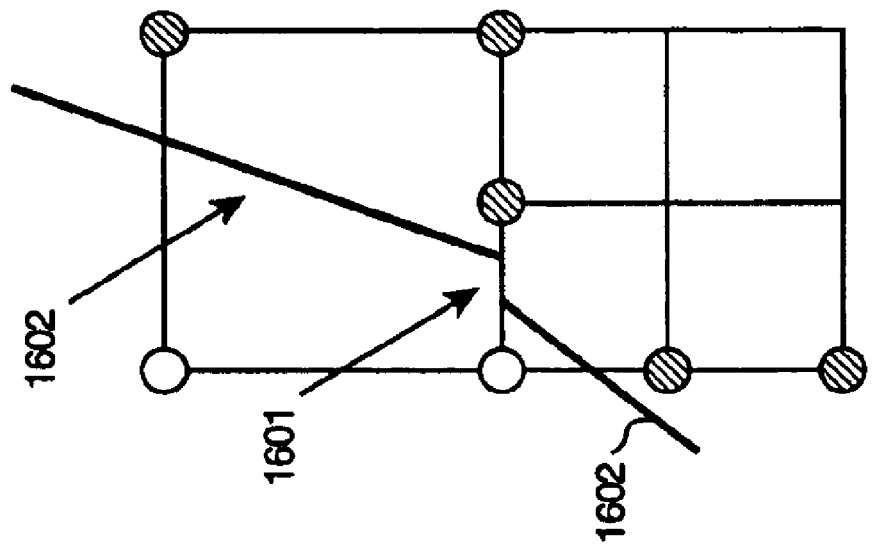

As shown in 2D in FIG. 16a, prior art methods can cause cracks in the triangulated surfaces 1602 where cells of two different sizes meet when the implicit function is adaptively sampled. This is because the interpolated vertex position of one cell may not match the interpolated position of its connected neighboring cell. These problems can be addressed in several ways, but in general, prior art solutions add significant complexities to triangulation methods.

In contrast, in the enhanced method of the present system, triangle vertices are generated at cell centers, and triangles can cross the faces and edges of different sized cells. Thus, the type of cracks shown in FIG. 16a do not appear. However, cracks may appear in the triangulated surface when the number of edge crossings between two neighboring sets of cells differs as illustrated in FIG. 16b.

This type of crack can be prevented by a pre-conditioning of the ADF during generation, or prior to triangulation. The pre-conditioning step compares the number of zero-crossings of the iso-surface across faces of boundary leaf cells to the total number of zero-crossings for the associated iso-surface of their face-adjacent neighbors.

When the number of zero-crossings are not equal, the cell is subdivided using distance values from its face-adjacent neighbors until the number of zero-crossings match. For example, the 2D cell on the top in FIG. 16b has no zero-crossings on its bottom edge while the edge-adjacent neighbors have a total of two zero crossings for the same edge. During pre-conditioning, the cell on the top is further subdivided.

The present system 100 also takes advantage of ADF's hierarchical data structure to produce LOD models. Rather than seeding triangle vertices in boundary leaf cells, the hierarchical data structure is traversed and vertices are seeded into boundary cells whose maximum error measure, computed during generation or editing, satisfy a user-specified threshold. Cells below these cells in the hierarchy are ignored. The error threshold can be varied continuously enabling fine control over the number of triangles generated in the LOD model.

Unlike most prior triangle decimation algorithms, the time to produce an LOD model, as described herein, is proportional to the number of vertices in the output mesh rather than the size of the input mesh. Generation times are orders of magnitude better than possible with prior art methods. The system 100 can generate a 200,000 triangle model in 0.37 seconds, and a 2000 triangle model in less than 0.010 seconds on a desktop system with a Pentium IV class processor.

Effects of the Invention

The present system integrates a powerful shape representation, with existing production pipelines that are used for digital character design and animation. The system is intuitive to use, expressive in the resolution and quality of detail that can be achieved, and efficient in memory usage and processing.

Described are methods that take ADFs beyond the concept stage into a practical, working system. These include: innovations in the volumetric sculpting interface that take advantage of the distance field and provide more control to the user, efficient generation and editing algorithms with reduced memory requirements, better memory coherency and reduced computation, several new rendering approaches that take advantage of hardware acceleration in standard PCs, and a very fast method for generating topologically consistent LOD triangle models from ADFs.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for converting an adaptively sampled distance field of a graphics model to a triangle model, the adaptively sampled distance field including a plurality of surface cells storing distance values having corresponding gradients, comprising:

assigning a vertex to a center location of each surface cell;

connecting the vertices of neighboring surface cells to form triangles while satisfying a predetermined constraint; and moving each vertex, in a single step, to a new location according to the distance value and corresponding gradient of the vertex to substantially conform the triangles to a surface of the model.

2. The method of claim 1 wherein each surface cell has edges connecting corners of the cells, and some neighboring surface cells have common edges and the predetermined constraint further comprises:

only connecting vertices in three neighboring surface cells having common edges, and at least one common edge intersects the surface of the graphics model.

3. The method of claim 2 further comprising;

deriving an orientation for each triangle from an orientation of the at least one common edge intersecting the surface.

4. The method of claim 2 further comprising:

considering less than all common edges of a particular surface cell when connecting the vertices.

5. The method of claim 4 wherein the considered edges connect to two diagonally opposing corners of the surface cell.

6. The method of claim 1 wherein the adaptively sampled distance field includes a root surface cell, intermediate surface cells, and leaf surface cells arranged in layers of a hierarchical tree, and wherein vertices are assigned only to leaf cells.

7. The method of claim 1 wherein the adaptively sampled distance field includes a root surface cell, intermediate surface cells, and leaf surface cells arranged in layers of a hierarchical tree, and wherein vertices are assigned to all surface cells up to a predetermined level in the hierarchical tree.

8. The method of claim 1 wherein the adaptively sampled distance field includes a root surface cell, intermediate surface cells, and leaf surface cells arranged in layers of a hierarchical tree, and each c ell has an associated error measure, and the vertices are assigned to cells having a particular error measure less than a predetermined threshold.

* * * * *